(12) United States Patent
Hagiwara

(10) Patent No.: US 11,579,411 B2
(45) Date of Patent: Feb. 14, 2023

(54) IMAGING LENS AND IMAGING APPARATUS

(71) Applicant: Tamron Co., Ltd., Saitama (JP)

(72) Inventor: Hiroyuki Hagiwara, Saitama (JP)

(73) Assignee: Tamron Co., Ltd., Saitama (JP)

( * ) Notice: Subject to any disclaimer, the term of this patent is extended or adjusted under 35 U.S.C. 154(b) by 458 days.

(21) Appl. No.: 15/989,638

(22) Filed: May 25, 2018

(65) Prior Publication Data

US 2019/0154986 A1 May 23, 2019

(30) Foreign Application Priority Data

Nov. 17, 2017 (JP) .............................. JP2017-221535

(51) Int. Cl.
*G02B 13/00* (2006.01)
*G02B 9/60* (2006.01)
*G02B 9/64* (2006.01)
*G02B 9/62* (2006.01)
*G02B 13/18* (2006.01)

(52) U.S. Cl.
CPC .......... *G02B 13/0045* (2013.01); *G02B 9/60* (2013.01); *G02B 9/62* (2013.01); *G02B 9/64* (2013.01); *G02B 13/006* (2013.01); *G02B 13/18* (2013.01)

(58) Field of Classification Search
CPC ........ G02B 9/62; G02B 9/64; G02B 13/0045; G02B 13/006; G02B 13/18
USPC .......................................................... 359/713
See application file for complete search history.

(56) References Cited

U.S. PATENT DOCUMENTS

| | | | | |
|---|---|---|---|---|
| 5,610,767 A | * | 3/1997 | Ito ...................... | G02B 15/1421 359/689 |
| 5,659,428 A | | 8/1997 | Hagimori | |
| 5,930,052 A | * | 7/1999 | Enomoto ............. | G02B 15/142 359/689 |
| 6,429,979 B2 | * | 8/2002 | Enomoto ............. | G02B 15/177 359/689 |
| 6,545,820 B2 | * | 4/2003 | Eguchi ............... | G02B 15/1421 359/716 |

(Continued)

FOREIGN PATENT DOCUMENTS

| | | |
|---|---|---|
| CN | 106154488 A | 11/2016 |
| JP | H0682696 A | 3/1994 |

(Continued)

OTHER PUBLICATIONS

English machine translation of JP H07-181387 (Year: 1995).*
English machine translation of JP-H07181387-A (Year: 1995).*

*Primary Examiner* — Nicholas R. Pasko
(74) *Attorney, Agent, or Firm* — The Webb Law Firm

(57) ABSTRACT

An imaging lens and an imaging apparatus capable of acquiring a long-distance object image at high resolution and capable of acquiring a short-distance object image in a wide range while, as a whole, being configured small. In order to achieve the object, an imaging lens according to the present invention is an imaging lens consisting of n (n is a natural number equal to or larger than six) lenses including a first lens having negative refractive power and a second lens having positive refractive power in order from an object side and including an n-th lens having negative refractive power and an n-1-th lens having positive refractive power in order from an image side, the imaging lens satisfying a predetermined conditional expression.

11 Claims, 8 Drawing Sheets

(56) References Cited

U.S. PATENT DOCUMENTS

| | | | |
|---|---|---|---|
| 7,227,694 B2 * | 6/2007 | Toyama | G02B 13/04 |
| | | | 359/749 |
| 8,054,562 B2 * | 11/2011 | Asami | G02B 13/16 |
| | | | 359/752 |
| 8,599,500 B2 * | 12/2013 | Ohashi | G02B 9/62 |
| | | | 359/795 |
| 8,854,747 B2 * | 10/2014 | Iwamoto | G02B 9/64 |
| | | | 359/755 |
| 9,086,525 B2 | 7/2015 | Ohashi | |
| 9,279,958 B2 * | 3/2016 | Noda | G02B 9/62 |
| 9,491,348 B2 | 11/2016 | Chen et al. | |
| 9,715,088 B1 * | 7/2017 | Yang | G02B 13/0045 |
| 10,114,195 B2 | 10/2018 | Son | |
| 2003/0081331 A1 * | 5/2003 | Abe | G02B 3/00 |
| | | | 359/796 |
| 2005/0231818 A1 | 10/2005 | Matsusaka | |
| 2005/0286138 A1 | 12/2005 | Matsusaka | |
| 2009/0073573 A1 | 3/2009 | Kanetaka | |
| 2010/0103539 A1 | 4/2010 | Kitahara | |
| 2012/0057247 A1 | 3/2012 | Mimura et al. | |
| 2014/0376107 A1 * | 12/2014 | Son | G02B 13/0045 |
| | | | 359/713 |
| 2015/0131169 A1 * | 5/2015 | Asami | G02B 9/62 |
| | | | 359/713 |
| 2016/0109687 A1 | 4/2016 | Son | |
| 2018/0088301 A1 * | 3/2018 | Otomo | G02B 13/0045 |
| 2018/0239113 A1 * | 8/2018 | Dai | G02B 13/0045 |

FOREIGN PATENT DOCUMENTS

| | | | |
|---|---|---|---|
| JP | H07-181387 | * | 7/1995 |
| JP | H07-181387 A | * | 7/1995 |
| JP | H07225338 A | | 8/1995 |
| JP | H0821954 A | | 1/1996 |
| JP | H10206737 A | | 8/1998 |
| JP | H1138320 A | | 2/1999 |
| JP | 200047108 A2 | | 2/2000 |
| JP | 2002196239 A | | 7/2002 |
| JP | 2005308953 A | | 11/2005 |
| JP | 200611096 A | | 1/2006 |
| JP | 2006308929 A | | 11/2006 |
| JP | 2007156385 A | | 6/2007 |
| JP | 2009258174 A | | 11/2009 |
| JP | 2010107532 A | | 5/2010 |
| JP | 2010191019 A | | 9/2010 |
| JP | 201195330 A | | 5/2011 |
| JP | 2012108278 A | | 6/2012 |
| JP | 2012173416 A | | 9/2012 |
| JP | 2014240918 A | | 12/2014 |
| JP | 201568910 A | | 4/2015 |
| JP | 2016188895 A | | 11/2016 |
| JP | 2017122793 A | | 7/2017 |

* cited by examiner

IMAGING LENS AND IMAGING APPARATUS

CROSS-REFERENCE TO RELATED APPLICATION

This application claims priority to Japanese Patent Application No. 2017-221535 filed Nov. 17, 2017, the disclosure of which is hereby incorporated in its entirety by reference.

BACKGROUND OF THE INVENTION

Field of the Invention

The present invention relates to an imaging lens and an imaging apparatus and, more particularly, to an imaging lens and an imaging apparatus suitable for a sensing camera.

Description of the Related Art

Imaging apparatuses including solid-state image sensors such as a CCD (Charge Coupled Device) and a CMOS (Complementary Metal Oxide Semiconductor) have become widely popular. In recent years, the number of pixels of an image sensor has increased. There is a demand for an imaging lens that is light in weight and can acquire an object image at high resolution even under a dark environment (under a low illuminance condition).

In recent years, besides imaging apparatuses portable by a user such as a single-lens reflex camera, a mirrorless single-lens camera, and a digital still camera, imaging apparatuses used under specific purposes such as an imaging apparatus for monitoring, an imaging apparatus for crime prevention, and a vehicle-mounted imaging apparatus have also been spread. Further, in recent years, various kinds of driving assistance have been performed by analyzing images acquired by the vehicle-mounted imaging apparatus using the vehicle-mounted imaging apparatus as a sensing camera. Importance of the vehicle-mounted imaging apparatus functioning as the sensing camera is increasing for realization of an automatic driving system in future.

Various imaging lenses having a relatively wide image viewing angle in which a negative lens is arranged closest to the object side have been proposed as imaging lenses applicable to the vehicle-mounted imaging apparatus and the like. For example, Japanese Patent Application Laid-Open No. 2010-107532 (Patent Literature 1) proposes an imaging lens consisting of a negative lens, a positive lens, a positive lens, a negative lens and a positive lens in order from an object side. In the imaging lens, all the lenses are spherical lenses made of glass to achieve a relatively light aperture ratio with an F value of 2.0 to 4.0 and improve environment resistance.

Japanese Patent Literature Laid-Open No. 2016-188895 (Patent Literature 2) proposes an imaging lens consisting of a negative lens, a meniscus shape lens, a positive lens, a negative lens, a positive lens, and a lens having an aspherical surface arranged in order from an object side. Such a configuration is adopted in the imaging lens to achieve a light aperture ratio with an F value of 1.6 to 2.0 and realize an imaging lens having high optical performance.

In the imaging lens disclosed in Patent Literature 1, a reduction in the outer diameter of the lens arranged closest to the object side is insufficient. Brightness is not considered to be sufficient in the imaging lens. On the other hand, in the imaging lens disclosed in Patent Literature 2, the outer diameter of the lens arranged closest to the object side is small and the F value is 1.6 to 2.0. Therefore, a reduction in size and an increase in an aperture are achieved. The imaging lens can be desirably applied to the imaging lens of the vehicle-mounted imaging apparatus. Compared with the imaging lens disclosed in Patent Literature 1, a wider angle is achieved in the imaging lens disclosed in Patent Literature 2. Therefore, it is possible to realize a vehicle-mounted imaging apparatus having a wide imagable range. If such an imaging lens having a wide image viewing angle is applied, it is possible to extensively perform detection of obstacles present around a vehicle, recognition of traffic lights, traffic signs, and the like.

Incidentally, in realizing the automatic driving system, it is requested to accurately detect a long-distance object such as a preceding vehicle traveling on a freeway. With the imaging lens disclosed in Patent Literature 2, it is possible to detect objects (obstacles, traffic lights, traffic signs, etc.) present around a vehicle in a wide range. However, it is difficult to detect a long-distance object. Therefore, when the imaging lens disclosed in Patent Literature 2 is applied to the sensing camera, another sensing device such as a millimeter wave radar apparatus needs to be used for the detection of the long-distance object.

An object of the present invention is to provide an imaging lens having a wide image viewing angle and an imaging apparatus that can form an image of a long-distance object at high resolution while, as a whole, being configured small.

SUMMARY OF THE INVENTION

In order to achieve the object, an imaging lens according to the present invention is an imaging lens consisting of n (n is a natural number equal to or larger than six) lenses including a first lens having negative refractive power and a second lens having positive refractive power in order from an object side and including an n-th lens having negative refractive power and an n−1-th lens having positive refractive power in order from an image side, the imaging lens satisfying a following conditional expression:

$$-0.5 > R_{11}/f > -5.0 \qquad (1)$$

where, $R_{11}$ represents a paraxial curvature radius of an object side surface of the first lens and f represents a focal length of the imaging lens.

In order to achieve the object, an imaging apparatus according to the present invention includes: the imaging lens; and an image sensor that receives an optical image formed by the imaging lens and converts the optical image into an electric image signal.

According to the present invention, it is possible to provide an imaging lens having a wide image viewing angle and an imaging apparatus that can form an image of a long-distance object at high resolution while, as a whole, being configured small.

Figure 1:
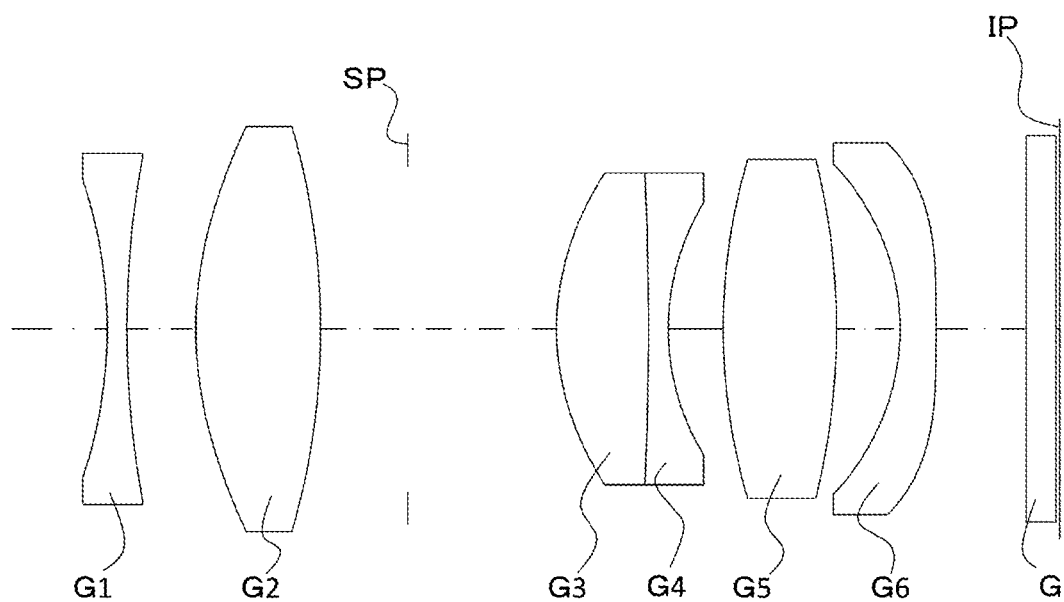
FIG. 1 is a sectional view showing a lens configuration example of an imaging lens of an example 1 according to the present invention.

Note that, as signs used in the diagrams described above, G1 indicates a first lens, G2 indicates a second lens, G3 indicates a third lens, G4 indicates a fourth lens, G5 indicates a fifth lens, G6 indicates a sixth lens, G7 indicates a seventh lens, G8 indicates an eighth lens, SP indicates an aperture stop, and IP indicates an image surface.

DETAILED DESCRIPTION OF THE PREFERRED EMBODIMENT

An embodiment of lens and an imaging apparatus according to the present invention is described below.

1. Imaging Lens 1-1. Optical Configuration of the Imaging Lens

First, an embodiment of the imaging lens according to the present invention is described. The imaging lens of the present embodiment is consisting of n (n is a natural number equal to or larger than six) lenses including a first lens having negative refractive power and a second lens having positive refractive power in order from an object side and including an n-th lens having negative refractive power and an n−1-th lens having positive refractive power in order from an image side.

In the imaging lens, an incident luminous flux is diverged in the first lens having the negative refractive power and divergent luminous flux is converged by the second lens having the positive refractive power. Therefore, even when strong negative refractive power is imparted to the first lens, it is possible to prevent the entire imaging lens from increasing in size. Therefore, it is possible to impart strong refractive power to the first lens. It is easy to reduce the outer diameter (the lens diameter) of the first lens.

Incidentally, when a vehicle-mounted imaging apparatus is mounted on a vehicle, the distal end portion of a lens barrel, which houses the imaging lens, is arranged on the outer side of the vehicle. However, the other portions of the lens barrel are often arranged on the inner side of the vehicle. In the imaging lens, since the outer diameter of the first lens is small, it is easy to reduce the size of the distal end portion of the lens barrel. Therefore, if the imaging lens is applied to an imaging optical system of the vehicle-mounted imaging apparatus, it is possible to make the presence of the vehicle-mounted imaging apparatus less conspicuous from the outer side of the vehicle (the object side). Note that the same applies to other imaging apparatuses such as an imaging apparatus for monitoring and an imaging apparatus for crime prevention installed and fixed in a building and a mobile body such as a vehicle.

In the imaging lens, on the image side, a luminous flux converged by the n−1-th lens is diverged by the n-th lens and made incident on an image surface. Therefore, it is possible to achieve a reduction in size in the radial direction concerning the image side of the imaging lens as well.

Preferred forms of lens shapes and the like are explained below.

(1) First Lens i) Object Side Surface

The object side surface of the first lens is a concave surface. The shape and the like of the object side surface are not particularly limited as long as the shape and the like satisfy a conditional expression (1) described below. If the object side surface of the first lens is a concave surface, negative distortion, that is, distortion of a barrel shape easily occurs. When the conditional expression (1) is satisfied, in the imaging lens, large negative distortion occurs compared with a normal imaging lens.

The imaging lens has an object of being able to form an image of a long-distance object at high resolution and, at the same time, achieving a wider angle. To make it possible to form an image of the long-distance object at the high resolution, it is necessary to use an imaging lens having a long focal length. This is because the imaging lens having the long focal length has high angular resolution compared with an imaging lens having a short focal length. Note that "the number of pixels on an image sensor per one degree of a viewing angle" is defined as "angular resolution". However, a imaging lens having a long focal length has a narrow image viewing angle compared with a imaging lens having a short focal length. Therefore, in the present invention, compared with a conventional lens, the imaging lens maintains high angular resolution for forming an image of long-distance object at high resolution near the paraxial and achieves a wider image viewing angle by causing larger negative distortion from the center of an image toward the periphery of image. Note that "near a paraxial part" refers to "within a range of approximately forty percent of an image height including the center of the image".

As explained above, the imaging lens has the high angular resolution near the paraxial and has a wide image viewing angle. Therefore, if the imaging lens is applied to an imaging optical system of a sensing camera to sense a traveling forward direction of a vehicle, it is possible to accurately detect a long-distance object such as a preceding vehicle traveling on a freeway. At the same time, it is possible to detect or recognize, in a wide range, obstacles present around the vehicle, traffic lights, traffic signs, and the like.

ii) Image Side Surface

An image side surface of the first lens may be a plane. However, the image side surface is desirably a concave surface to impart stronger negative refractive power to the first lens. By forming the first lens in a biconcave shape, it is possible to distribute and arrange negative refractive power respectively on the object side surface and the image side surface. It is easy to increase the negative refractive power of the first lens and achieve a reduction in the size of the first lens.

(2) Second Lens

The lens shape of the second lens is not particularly limited as long as the second lens has positive refractive power. However, the second lens desirably has a biconvex shape from the viewpoint of arranging strong positive refractive power in the second lens. As explained above, in the imaging lens, an incident luminous flux is diverged in the first lens having the negative refractive power and the diverged luminous flux is converged in the second lens having the positive refractive power. Therefore, when strong negative refractive power is arranged in the first lens, it is desirable to arrange strong positive refractive power in the second lens in preventing an increase in the size of the entire imaging lens. If the second lens is formed in the biconvex shape, it is possible to distribute and arrange the positive refractive power on the object side surface and the image side surface and to reduce decentering sensitivity. Therefore, it is possible to facilitate assembly work of the imaging lens and to reduce performance fluctuation due to a manufacturing process.

It is desirable that at least one surface of the second lens is an aspherical surface. It is possible to correct a spherical aberration by forming at least one surface of the second lens as the aspherical surface. Therefore, even when the number of lenses configuring the imaging lens is minimized (n=6), it is possible to realize satisfactory optical performance.

(3) N-th Lens

In the present invention, "n" is a number equivalent to the number of lenses (single lenses) configuring the imaging lens (n is a natural number equal to or larger than six). In the present invention, the n-th lens refers to a lens arranged closest to the image side and refers to a lens arranged "n"-th when counted from the object side. The n-th lens only has to have negative refractive power. The lens shape of the n-th lens is not particularly limited. However, the n-th lens is formed in a meniscus shape convex to the image side, so that it is possible to direct a luminous flux made incident on the image surface upward and more satisfactorily correct field curvature, which occurs on the object side surface of the first lens, with the n-th lens.

It is desirable that at least one surface of the n-th lens is an aspherical surface. It is possible to satisfactorily correct a spherical aberration by forming at least one surface of the n-th lens as the aspherical surface. Therefore, even when the number of lenses configuring the imaging lens is minimized (n=6), it is possible to realize satisfactory optical performance.

(4) n–1-th Lens

The n–1-th lens refers to a lens arranged on the object side of the n-th lens and refers to a lens arranged second when counted from the image side. The lens shape of the n–1-th lens is not particularly limited as long as the n–1-th lens has strong positive refractive power. However, it is desirable that the n–1-th lens has a biconvex shape from the viewpoint of arranging strong positive refractive power in the n–1-th lens and achieving a reduction in the size of the imaging lens.

(5) n–3-th Lens and n–2-th Lens

The imaging lens is consisting of the n lenses. Therefore, the imaging lens includes at least two lenses between the second lens and the n–1-th lens. A preferred form of the lenses arranged between the second lens and the n–1-th lens is explained below.

First, it is desirable that the imaging lens includes an n–3-th lens having positive refractive power between the second lens and the n–1-th lens. It is easy to achieve a reduction in the diameter of the imaging lens by arranging the n–3-th lens having a converged effect on the image side of the second lens. In this case, the n–3-th lens is more desirably a lens arranged fourth from the image side. When n=6, it is desirable that at least one surface of the n–3-th lens is an aspherical surface in performing correction of a spherical aberration.

In the imaging lens, it is desirable that the imaging lens includes an n–2-th lens having negative refractive power between the n–3-th lens and the n–1-th lens. It is possible to satisfactorily perform correction of a chromatic aberration by arranging the n–2-th lens having the negative refractive power on the image side of the n–3-th lens having the positive refractive power. In this case, it is more desirable that the n–2-th lens is arranged adjacent to the image side of the n–3-th lens.

Further, it is desirable that the n–3-th lens and the n–2-th lens are cemented. When the n–3-th lens and the n–2-th lens are integrated as a cemented lens, it is easy to adjust an array of the lenses when the imaging lens is manufactured. It is possible to reduce the decentering sensitivity.

(6) Number of Lenses

The number of lenses (n) configuring the imaging lens is not particularly limited as long as the number of lenses (n) is six or more. However, when the number of lenses increases, it is difficult to reduce the optical overall length of the imaging lens. The increase in the number of lenses is undesirable from the viewpoint of cost. Therefore, the number of lenses configuring the imaging lens is desirably nine or less and more desirably eight or less.

(7) Lens Glass Material

All of the first lens to the n-th lens configuring the imaging lens according to the present invention are desirably glass lenses. The glass lens has high thermal stability and small expansion and contraction involved in temperature fluctuation compared with plastic. Therefore, by adopting the glass lenses to all the lenses, it is possible to satisfactorily prevent fluctuation in a focal position and fluctuation in an image viewing angle even when a use environment temperature changes. When the n–3-th lens and the n–2-th lens are cemented, it is desirable that a conditional expression (10) explained below is satisfied in realizing an imaging lens having high thermal stability.

(8) Stop

In the imaging lens according to the present invention, an arrangement position of a stop (an aperture stop) is not particularly limited. For example, the stop can be arranged on the image side of the second lens or the object side of the n–3-th lens. However, as the stop is arranged closer to the image side of the imaging lens, an incident angle of principal ray with respect to the image surface increases. It is difficult to appropriately make the imaging light incident on a photodiode arranged in an image sensor. As a result, since it is difficult to secure proper exposure, sensitivity unevenness (shading unevenness) and coloring of a periphery undesirably occur. Therefore, the stop is desirably arranged between the second lens and the n−3-th lens and more desirably arranged on the object side (immediately before) the n−3-th lens.

1-2. Conditional Expressions

In the imaging lens, the configuration explained above is adopted. Further, at least one or more of conditional expressions explained below are satisfied. Consequently, it is possible to realize an imaging lens having a wide image viewing angle that can form an image of a long-distance object at high resolution while, as a whole, being configured small.

1-2-1. Conditional Expression (1)

The imaging lens desirably satisfies the following conditional expression (1):

$$-0.5 > R_{11}/f > -5.0 \tag{1}$$

where, $R_{11}$ represents a paraxial curvature radius of the object side surface of the first lens and f represents a focal length of the imaging lens.

Note that a sign of the paraxial curvature radius is positive (+) when a curvature center of a lens surface is present on the image side with respect to the lens surface and is negative (−) when the curvature center is present on the object side. The same applies in a conditional expression (3) explained below.

The conditional expression (1) is an expression specifying a ratio of the paraxial curvature radius $R_{11}$ of the object side surface of the first lens to the focal length f of the imaging lens. As explained above, in the imaging lens, the object side surface of the first lens is formed as the concave surface and the conditional expression (1) is satisfied to cause the negative distortion larger than the negative distortion of the normal imaging lens. Therefore, as explained above, it is possible to realize an imaging lens having a wide image viewing angle that can form an image of a long-distance object at high resolution.

On the other hand, when a numerical value of the conditional expression (1) is equal to or smaller than a lower limit value, the curvature of the object side surface of the first lens becomes loose. It is difficult to cause the large negative distortion. Therefore, when it is attempted to maintain angular resolution requested for imaging a long-distance object at high resolution, an image viewing angle becomes narrow compared with when the conditional expression (1) is satisfied. Therefore, it is undesirable to prioritize the formation of an image of a long-distance object at high resolution by the imaging lens because it is difficult to achieve an increase in an image viewing angle.

On the other hand, when the numerical value of the conditional expression (1) is equal to or larger than an upper limit value, the curvature of the object side surface of the first lens becomes tight. This is advantageous in causing large negative distortion. However, like the distortion increasing when the paraxial curvature radius of the object side surface of the first lens is equal to or larger than the upper limit value, various aberrations such as a comatic aberration and field curvature also increase. This is undesirable because it is difficult to secure satisfactory optical performance.

In obtaining the effect explained above, the upper limit value of the conditional expression (1) is desirably −0.7, more desirably −0.8, and still more desirably −0.9. The lower limit value of the conditional expression (1) is desirably −3.0, more desirably −2.0, still more desirably −1.8, and yet still more desirably −1.2.

1-2-2. Conditional Expression (2)

The imaging lens desirably satisfies the following conditional expression (2):

$$w < 45° \tag{2}$$

where, w represents a half image viewing angle of the imaging lens.

The conditional expression (2) is an expression specifying a half image viewing angle of the imaging lens. By satisfying the conditional expression (2), it is possible to realize an imaging lens securing a relatively wide image viewing angle and having high angular resolution near a paraxial part. Therefore, it is possible to form an image of a long-distance object at high resolution. It is possible to realize an imaging lens having a wide image viewing angle compared with an imaging lens having the same degree of a focal length.

If a numerical value of the conditional expression (2) is equal to or larger than an upper limit value, an image viewing angle is too wide. It is difficult to realize an imaging lens having high angular resolution. This is undesirable because it is difficult to form an image of a long-distance object at high resolution.

As the numerical value of the conditional expression (2) is smaller, a focal length increases. It is possible to realize a lens having high angular resolution. From the viewpoint, the upper limit value of the conditional expression (2) is more desirably 40°, still more desirably 35°, and yet more desirably 30°, and yet still more desirably 25°.

On the other hand, in the viewpoint of forming an image of a long-distance object at high resolution, it is not particularly necessary to specify a lower limit value. However, when the numerical value of the conditional expression (2) decreases, since the image viewing angle decreases, an imagable range narrows. Therefore, from the viewpoint of realizing an imaging lens that can form an image of a long-distance object at high resolution and has a wide image viewing angle compared with a focal length, the lower limit value of the conditional expression (2) is more desirably 15° and still more desirably 20°. However, it is possible to determine the numerical value of the conditional expression (2) as appropriate according to the distance to an object, an image of which has to be formed by the imaging lens, a range in which sensing is requested, and the like.

1-2-3. Conditional Expression (3)

The imaging lens desirably satisfies the following conditional expression (3):

$$|R_{11}| < R_{12} \tag{3}$$

where, $R_{11}$ represents a paraxial curvature radius of the object side surface of the first lens and $R_{12}$ represents a paraxial curvature radius of the image side surface of the first lens.

The conditional expression (3) is an expression specifying a relation between the paraxial curvature radius of the object side surface of the first lens and the paraxial curvature radius of the image side surface of the first lens. When the conditional expression (3) is satisfied, the first lens has a tighter curvature on the object side surface than on the image side surface. Therefore, by satisfying the conditional expression (3), it is easy to maintain angular resolution requested for forming an image of a long-distance object at high resolution and to cause larger negative distortion from the center toward the periphery of an image. It is easier to realize an increase in an image viewing angle.

As explained above, the image side surface of the first lens can be a plane ($R_{12}=\infty$). Even if the image side surface of the first lens is the plane, it is possible to cause negative distortion and achieve the object of the present invention. However, if the image side surface of the first lens is the plane, ghost easily occurs when a strong light from the light source is incident on the imaging lens. When the imaging lens is applied to an imaging optical system of a sensing camera, it is difficult to accurately perform detection of an object when ghost occurs. Therefore, it is preferable that the conditional expression (3) is satisfied and the image side surface of the first lens is a concave surface, that is, the first lens has a biconcave shape.

On the other hand, the conditional expression (3) is not satisfied when the image side surface of the first lens is a convex surface, when the curvatures of the object side surface and the image side surface of the first lens are the same, or when the curvature of the object side surface of the first lens is looser than the curvature of the image side surface.

When the image side surface of the first lens is the convex surface, that is, the first lens has a meniscus shape convex to the image side, it is difficult to increase negative refractive power. As a result, it is difficult to achieve a reduction in the diameter of the first lens. Similarly, when the curvatures of the object side surface and the image side surface of the first lens are the same, it is difficult to increase the negative refractive power. It is difficult to reduce the diameter of the first lens. On the other hand, when the curvature of the object side surface of the first lens is looser than the curvature of the image side surface, it is possible to increase the negative refractive power. However, a distortion amount is insufficient. This is undesirable because it is difficult to realize an increase in an image viewing angle compared with a focal length.

1-3-4. Conditional Expression (4)

The imaging lens desirably satisfies the following conditional expression (4):

$$d_{1-2}/f < 0.8 \quad (4)$$

where, $d_{1-2}$ represents an air interval on the optical axes between the first lens and the second lens and f represents the focal length of the entire system of the imaging lens.

The conditional expression (4) is an expression specifying a ratio of the air interval on the optical axes between the first lens and the second lens to the focal length of the imaging lens. In the imaging lens, the first lens having the negative refractive power is arranged closest to the object side. When the conditional expression (4) is satisfied, the air interval on the optical axes between the first lens and the second lens is within an appropriate range. It is possible to make a luminous flux which diverged in the first lens incident on the second lens before the diameter of the luminous flux excessively increases. Therefore, it is easier to achieve a reduction in the size of the imaging lens.

On the other hand, when a numerical value of the conditional expression (4) is equal to or larger than an upper limit value, the air interval on the optical axes between the first lens and the second lens become excessively wide with respect to the focal length of the imaging lens. Then, it is necessary to increase the outer diameter of the second lens. The optical overall length also increases. This is undesirable in achieving a reduction in the size of the imaging lens.

In obtaining the effect explained above, the upper limit value of the conditional expression (4) is more desirably 0.6, still more desirably 0.4, yet more desirably 0.3, and yet still more desirably 0.2.

On the other hand, when the first lens and the second lens are cemented, that is, when "$d_{1-2}=0$", this is undesirable because correction of field curvature is difficult. Therefore, from the viewpoint, a lower limit value of the conditional expression (4) is desirably larger than 0, more desirably 0.01 or more, and still more desirably 0.1 or more.

1-3-5. Conditional Expression (5)

The imaging lens desirably satisfies the following conditional expression (5):

$$0.5 < |f_1/f| < 5.0 \quad (5)$$

where, $f_1$ represents a focal length of the first lens and f represents the focal length of the imaging lens.

The conditional expression (5) is an expression specifying a ratio of the focal length of the first lens to the focal length of the imaging lens. In the present invention, compared with a conventional lens, the imaging lens maintains high angular resolution near the paraxial and achieves a wider image viewing angle by causing larger negative distortion from the center of an image toward the periphery of image. When the conditional expression (5) is satisfied, in obtaining the function, the refractive power of the first lens is within a proper range. It is possible to achieve a reduction in the size of the outer diameter of the first lens and perform accurate sensing concerning a short-distance object image (a peripheral image) acquired in a wide range.

On the other hand, when a numerical value of the conditional expression (5) is equal to or larger than an upper limit value, the refractive power of the first lens decreases. It is necessary to increase the outer diameter of the first lens to cause negative distortion larger than the negative distortion of the normal imaging lens. This is undesirable because it is difficult to achieve a reduction in the size of the imaging lens. On the other hand, when the numerical value of the conditional expression (5) is equal to or smaller than a lower limit value, the refractive power of the first lens increases. This is desirable in achieving a reduction in the size of the outer diameter of the first lens. However, in this case, it is difficult to correct various aberrations such as field curvature. Optical performance of the imaging lens is deteriorated. This is undesirable because it is difficult to perform accurate sensing.

In obtaining the effect, the upper limit value of the conditional expression (5) is more desirably 2.0 and still more desirably 1.4. The lower limit value of the conditional expression (5) is more desirably 0.7 and still more desirably 0.9.

1-2-6. Conditional Expression (6)

The imaging lens desirably satisfies the following conditional expression (6):

$$0.5 < f_2/f < 5.0 \quad (6)$$

where, $f_2$ represents a focal length of the second lens and f represents the focal length of the imaging lens.

The conditional expression (6) is an expression specifying a ratio of the focal length of the second lens to the focal length of the imaging lens. When the conditional expression (6) is satisfied, the refractive power of the second lens is within a proper range. It is easy to achieve a reduction in the size of the imaging lens while preventing occurrence of a spherical aberration.

On the other hand, when a numerical value of the conditional expression (6) is equal to or larger than an upper limit value, the refractive power of the second lens decreases. It is difficult to sufficiently converge, with the second lens, a luminous flux made incident from the first lens. Therefore, the outer diameters of the lenses arranged further on the image side than the second lens increase. An air interval on the optical axes between the second lens and the third lens also increases and the optical overall length also increases. Consequently, it is difficult to achieve a reduction in the size of the imaging lens.

On the other hand, when the numerical value of the conditional expression (6) is equal to or smaller than a lower limit value, the refractive power of the second lens increases. An effect of conversing, with the second lens, the luminous flux made incident from the first lens increases. This is desirable in achieving a reduction in the size of the imaging lens. However, when the refractive power of the second lens is excessively large, this is undesirable because it is difficult to prevent occurrence of a spherical aberration even if the shapes of the object side surface and the image side surface of the second lens are adjusted.

In obtaining the effect, the upper limit value of the conditional expression (6) is more desirably 4.0, still more desirably 3.0, yet more desirably 2.0, and yet still more desirably 1.5. The lower limit value of the conditional expression (6) is more desirably 0.7 and still more desirably 0.9.

1-2-7. Conditional Expression (7)

The imaging lens desirably satisfies the following conditional expression (7):

$$0 > |f_{(n-1)n}/f| < 50.0 \qquad (7)$$

where, $f_{(n-1)n}$ represents a composite focal length of the n−1-th lens and the n-th lens and f represents a focal length of the imaging lens.

The conditional expression (7) is an expression specifying a ratio of the composite focal length of the n−1-th lens and the n-th lens to the focal length of the imaging lens. By satisfying the conditional expression (7), composite refractive power of the n−1-th lens and the n-th lens arranged on the image side of the imaging lens is within a proper range. It is possible to achieve a reduction in size in the radial direction concerning the image side of the imaging lens as well. Further, by increasing negative distortion from the center toward the periphery of an image, it is possible to satisfactorily perform correction of field curvature while achieving an increase in an angle of the imaging lens. Therefore, it is possible to perform accurate sensing concerning a short-distance object image acquired in a wide range.

In obtaining the effect, an upper limit value of the conditional expression (7) is more desirably 30, still more desirably 20, and yet more desirably 10, and yet still more desirably 7. The composite focal length of the n−1-th lens and the n-th lens is desirably positive ($0 < f_{(n-1)n}$). When $0 < f_{(n-1)n}$, the lower limit value is more desirably 2.

1-2-8. Conditional Expression (8)

The imaging lens desirably satisfies the following conditional expression (8):

$$0.5 < |f_n/f| < 5.0 \qquad (8)$$

where, $f_n$ represents a focal length of the n-th lens and f represents the focal length of the imaging lens.

The conditional expression (8) is an expression specifying a ratio of the focal length of the n-th lens to the focal length of the imaging lens. In the imaging lens, as explained above, when the strong negative refractive power is arranged in the first lens and the imaging lens is compared with the normal imaging lens, large negative distortion is caused. Therefore, field curvature also easily occurs in the imaging lens. Therefore, by satisfying the conditional expression (8), it is easy to maintain the outer diameter of the n-th lens small while satisfactorily correcting field curvature caused in the first lens by the n-th lens.

On the other hand, when a numerical value of the conditional expression (8) is equal to or larger than an upper limit value, negative refractive power of the n-th lens is too large. It is difficult to correct field curvature. On the other hand, when the numerical value of the conditional expression (8) is equal to or smaller than a lower limit value, the outer diameter of the n-th lens increases. This is undesirable because it is difficult to achieve a reduction in the size of the imaging lens.

In obtaining the effect, the upper limit value of the conditional expression (8) is desirably 3.5, more desirably 3.0, still more desirably 2.5, yet more desirably 2.1, yet still more desirably 1.7, and yet still more desirably 1.3. The lower limit value is more desirably 0.7 and still more desirably 0.8.

1-2-9. Conditional Expression (9)

The imaging lens desirably includes an n−3-th lens having positive refractive power disposed between the second lens and the n−1-th lens and a n−2-th lens having negative refractive power disposed between the n−3-th lens and the n−1-th lens, and the imaging lens desirably satisfies the following conditional expression (9):

$$f_{(n-3)(n-2)}/f < 20.0 \qquad (9)$$

where, $f_{(n-3)(n-2)}$ represents a composite focal length of the n−3-th lens and the n−2-th lens.

The conditional expression (9) is an expression specifying a ratio of the composite focal length of the n−3-th lens and the n−2-th lens to the focal length of the imaging lens. The n−2-th lens is desirably arranged adjacent to the image side of the n−3-th lens.

By satisfying the conditional expression (9), it is possible to satisfactorily perform correction of various aberrations while preventing the total optical length of the imaging lens from increasing. It is easy to realize an imaging lens having high optical performance.

A lower limit value of the conditional expression (9) is not particularly specified. However, in obtaining satisfactory optical performance while maintaining the imaging lens small, the lower limit value is desirably larger than −20.0, more desirably larger than −10.0, and still more desirably larger than −2.0. The composite focal length of the n−3-th lens and the n−2-th lens is more desirably positive. That is, the lower limit value of the conditional expression (9) is desirably larger than 0.

When the composite focal length of the n−3-th lens and the n−2-th lens is positive and a numerical value of the conditional expression (9) increases, positive composite refractive power of the n−3-th lens and the n−2-th lens decreases and the optical overall length increases. Therefore, from the viewpoint of reducing the optical overall length of the imaging lens, an upper limit value of the conditional expression (9) is desirably 15.0, more desirably 10.0, and still more desirably 8.0. When the numerical value of the conditional expression (9) decreases, the positive composite refractive power of the n−3-th lens and the n−2-th lens increases. Note that, when the positive composite refractive power of the n−3-th lens and the n−2-th lens is excessively large, it is difficult to correct various aberrations. From the viewpoint, the lower limit value of the conditional expression (9) is more desirably larger than 2.0.

1-2-10. Conditional Expression (10)

In the imaging lens, it is desirably that the n−3-th lens and the n−2-th lens are cemented and the following conditional expression (10) is satisfied:

$$0 \leq |\alpha_{(n-3)} - \alpha_{(n-2)}| < 50 \times 10^{-7} \qquad (10)$$

where, α(n-3) represents an average coefficient of linear expansion (1×10⁻⁷/K) at -30° C. to 70° C. of a glass material forming the n-3-th lens and α(n-2) represents an average coefficient of linear expansion (1×10⁻⁷/K) at -30° C. to 70° C. of a glass material forming the n-2-th lens.

The conditional expression (10) is an expression specifying a difference between an average coefficient of linear expansion of the glass material forming the n-3-th lens and an average coefficient of linear expansion of the glass material forming the n-2-th lens. The glass materials expand and contract according to a change in an ambient temperature. When the conditional expression (10) is satisfied, degrees of the expansion and contraction of both the glass materials with respect to the change in the ambient temperature are the same. Therefore, even when the ambient temperature changes between -30° C. and 70° C., since both the glass materials expand and contract in the same degree, it is possible to prevent both the lenses from separating in a cemented part. Therefore, even when the imaging lens is exposed to a severe change of the ambient temperature, for example, when the imaging lens is applied to an imaging optical system of a vehicle-mounted imaging apparatus or the like, it is possible to maintain the cementing of the n-3-th lens and the n-2-th lens. It is possible to realize an imaging lens having a high temperature resistance characteristic.

In obtaining the effect, an upper limit value of the conditional expression (10) is more desirably 40×10⁻⁷, still more desirably 30×10⁻⁷, yet more desirably 20×10⁻⁷, and yet still more desirably 10×10⁻⁷.

2-1-11. Others

The imaging lens also desirably satisfies the following conditional expression:

$$f/(4 \times YS_1) \leq 1.0$$

where, f represents the focal length of the imaging lens and $YS_1$ represents a maximum above-ray beam height of an on-axis beam on the object side surface of the first lens.

When the conditional expression is satisfied, the imaging lens is a bright light imaging lens having a large aperture with an F value of 2.0 or less. Therefore, it is possible to acquire a clear object image even under a dark environment such as night. Therefore, when the imaging lens is applied to an imaging optical system of a sensing camera, it is possible to realize satisfactory long-distance sensing and short-distance sensing irrespective of day and night.

As an upper limit value of the conditional expression is smaller, it is possible to realize a bright light imaging lens with a small F value. Therefore, the upper limit value of the conditional expression is more desirably 0.95, still more desirably 0.90, and yet still more desirably 0.85.

2. Imaging Apparatus

An imaging apparatus according to the present invention is explained. The imaging apparatus according to the present invention includes the imaging lens according to the present invention explained above and an image sensor that receives an optical image formed by the imaging lens and converts the optical image into an electric image signal.

The image sensor and the like are not particularly limited. Solid-state image sensors such as a CCD (Charge Coupled Device) sensor and a CMOS (Complementary Metal Oxide Semiconductor) sensor can also be used. The imaging apparatus according to the present invention is suitable for imaging apparatuses including the solid-state image sensors such as a digital camera and a video camera. Naturally, the imaging apparatus may be an imaging apparatus of a lens fixed type in which lenses are fixed to a housing or may be an imaging apparatus of a lens replacement type such as a single-lens reflex camera or a mirrorless single-lens camera.

The imaging apparatus according to the present invention can be used in an imaging apparatus of an installed and fixed type installed and fixed in a vehicle body, a building, or the like and used for a specific purpose such as monitoring or sensing like a vehicle-mounted imaging apparatus besides a general imaging apparatus used to image an object for an appreciation purpose. The imaging lens according to the present invention can image a long-distance object at high resolution, being configured small as a whole, and realizes a wide image viewing angle compared with a focal length, by causing larger negative distortion than negative distortion of the normal imaging lens. Therefore, it is possible to make the presence of the imaging apparatus less conspicuous from the outer side of the vehicle body or the like, make imaging an object located in a remote place with one imaging apparatus, and make imaging the periphery of the object in a wide range. Therefore, the imaging apparatus is suitable for a vehicle-mounted imaging apparatus and the like and, in particular, suitable for a sensing camera mounted on various mobile bodies (a land mobile body, an air mobile body, and a marine mobile body) and used to detect or recognize objects present ahead in traveling directions of or around the mobile bodies. Note that the mobile bodies include, besides vehicles such as an automobile, an airplane, and a ship, various mobile bodies such as an unmanned aircraft (a drone, etc.) or an unmanned probe and a robot (including a cleaning robot) including a self-contained moving function such as a self-contained two-legged robot.

The present invention is specifically explained with reference to examples. However, the present invention is not limited to the examples explained below. Imaging lenses of the examples explained below are imaging lenses used in imaging apparatuses (optical apparatuses) such as a digital camera, a video camera, and a silver halide film camera. In particular, the imaging lenses can be desirably applied to a vehicle-mounted imaging apparatus and the like and can be desirably applied to sensing cameras mounted on various mobile bodies. In lens sectional views, the left is the object side and the right is the image side on the drawings.

Example 1

(1) Configuration of an Imaging Lens

FIG. 1 is a lens sectional view showing the configuration of an imaging lens of an example 1 according to the present invention. The imaging lens is consisting of, in order from the object side, the biconcave-shaped first lens G1 having negative refractive power, the biconvex-shaped second lens G2 having positive refractive power, a cemented lens formed by joining the third lens G3 having positive refractive power and the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n-1-th lens in the present invention, the fourth lens G4 is the n-2-th lens in the present invention, and the third lens G3 is the n-3-th lens in the present invention. As shown in Table 1 below, both the surfaces of the second lens G2, the object side surface of the third lens G3 (the n−3-th lens), and both the surfaces of the sixth lens G6 (the n-th lens) are respectively aspherical surfaces.

Note that, in FIG. 1, "IP" indicates an image surface. The image surface is the imaging surface of the solid-state image sensor such as the CCD sensor or the CMOS sensor explained above. Light made incident from the object side of the imaging lens forms an image on the image surface. The solid-state image sensor converts a received optical image into an electric image signal. A digital image corresponding to an image of an object is generated by an image processing section (an image processing processor, etc.) included in the imaging apparatus or the like on the basis of the electric image signal output from the image sensor. The digital image can be recorded in a recording medium such as a HDD (Hard Disk Device), a memory card, an optical disk, or a magnetic tape. Note that the image surface may be a film surface of a silver halide film.

"G" shown on the object side of the image surface IP indicates an optical block. The optical block G is equivalent to an optical filter, a face plate, a quartz low-pass filter, an infrared cut filter, or the like. The signs (IP and G) indicate the same components in the figures referred to in the other examples. Therefore, explanation of the signs is omitted below.

(2) Numerical Value Examples

Numerical value examples applied with specific numerical values of the imaging lens adopted in the example 1 are explained. Lens data of the imaging lens is shown in Table 1. In Table 1, a "surface number" indicates a number of a lens surface counted from the object side, "r" indicates a curvature radius of the lens surface (a value INF of r indicates that a surface having the value is a plane), "d" indicates an interval on optical axes of lens surfaces between an i-th (i is a natural number) lens from the object side and an i+1-th lens surface, "nd" indicates a refractive index with respect to a d-ray (a wavelength λ=587.56 nm), and "vd" indicates an Abbe number with respect to the d-ray. However, when the lens surface is an aspherical surface, "*" is added after the surface number in the table. When the lens surface is the aspherical surface, a paraxial curvature radius of lens surface is shown in a field of "r".

In Table 2, various data of the imaging data are shown. Specifically, a focal length (mm), an F number (an F value), a half image viewing angle (°), an image height (mm), a total lens length (mm), and a back focus (BF) (mm) are shown. The total lens length is a value obtained by adding a back focus to the distance on an optical axis from the object side surface of the first lens to the image side surface of the n-th lens, that is, the sixth lens G6 arranged closest to the image side. The back focus is a value obtained by air-converting the distance from an image side surface to a paraxial image surface of the n-th lens.

Aspherical surface data is shown in Table 3. As the aspherical surface data, concerning the aspherical surface shown in Table 1, an aspherical surface coefficient in the case of definition of the shape of the aspherical surface by the following expression is shown. Note that the aspherical surface coefficient can be represented by the following aspherical surface expression with displacement in an optical axis direction in the position of height h from the optical axis set as a surface vertex reference. In Table 3, "E−a" means "×10$^{-a}$".

$$z=ch^2/[1+\{1-(1+k)c^2h^2\}^{1/2}]+A4h^4+A6h^6+A8h^8+A10h^{10}\ldots$$

where, c represents a curvature (1/r), h represents height from the optical axis, k represents a conical coefficient (a conic constant), and A4, A6, A8, A10 . . . are aspherical surface coefficients of respective orders. "E±m" (m represents an integer) in numerical values of the aspherical surface coefficient and the conic constant means "×10$^{±m}$".

Table 4 shows an average coefficient of linear expansion (unit: 1×10$^{-7}$/K) at −30° C. to 70° C. of glass materials forming the n−3-th lens and the n−2-th lens.

The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 1 can be referred to. Matters concerning the tables are the same in tables explained in the other examples. Therefore, explanation of the matters is omitted below.

Figure 2:
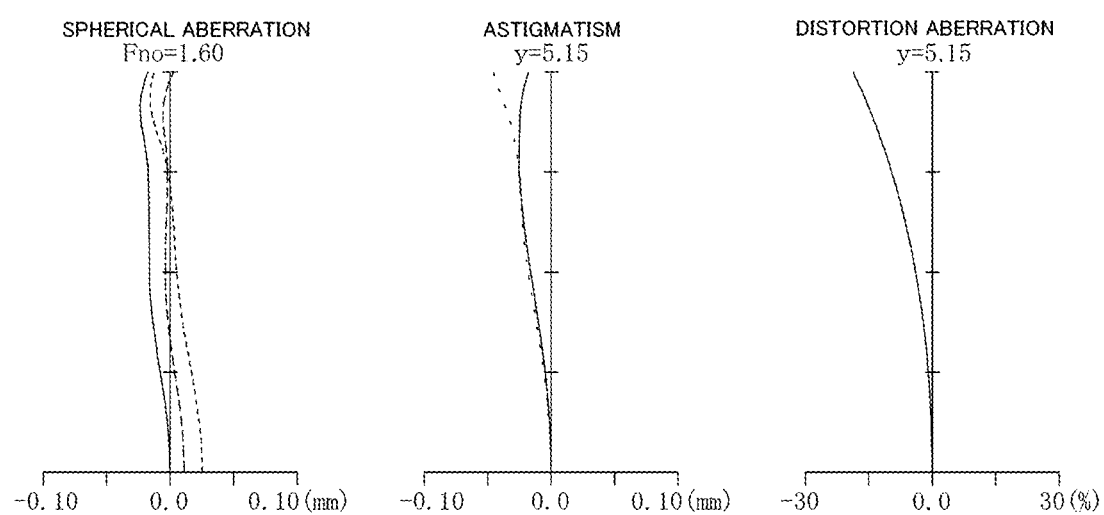
FIG. 2 is a spherical aberration diagram, an astigmatism diagram, and a distortion aberration diagram during infinity focus of the imaging lens of the example 1.

A longitudinal aberration diagram during infinity focus of the imaging lens is shown in FIG. 2. In the longitudinal aberration diagram shown in FIG. 2, a spherical aberration (mm), an astigmatism (mm), and a distortion aberration (%) are shown in order from the left side on the drawing. In the figure representing the spherical aberration, the vertical axis represents a maximum aperture (Fno). A solid-ray indicates a spherical aberration on a d-ray (having a wavelength of 587.56 nm), a long broken line indicates a spherical aberration on a C-ray (having a wavelength of 656.27 nm), and a short broken line indicates a spherical aberration on a g-ray (having a wavelength of 435.84 nm).

In the figure representing the astigmatism, the vertical axis represents an image height (y). A solid-ray indicates a sagittal direction on the d-ray (having a wavelength of 587.56) and a broken line indicates a meridional direction on the d-ray.

In the figure representing the distortion aberration, an image height (y) is plotted on the vertical axis. A distortion aberration (distortion) on the d-ray (having a wavelength of 587.56 nm) is shown. As shown in FIG. 2, the imaging lens has a large negative distortion aberration. Matters concerning the longitudinal aberration diagrams are the same in longitudinal aberration diagrams explained in the other embodiments. Therefore, explanation of the matters is omitted below.

TABLE 1

| Surface NO. | r | d | nd | vd |
|---|---|---|---|---|
| 1 | −14.000 | 0.600 | 1.5688 | 56.04 |
| 2 | 28.440 | 2.097 | | |
| 3* | 11.407 | 3.800 | 1.5920 | 67.02 |
| 4* | −22.478 | 2.641 | | |
| 5 (Stop) | INF | 4.542 | | |
| 6* | 7.856 | 2.800 | 1.7725 | 49.5 |
| 7 | −94.000 | 0.600 | 1.7521 | 25.05 |
| 8 | 7.280 | 1.671 | | |
| 9 | 18.000 | 3.450 | 1.8042 | 46.5 |
| 10 | −21.000 | 1.931 | | |
| 11* | −7.326 | 1.100 | 1.5831 | 59.46 |
| 12* | −139.074 | 2.740 | | |
| 13 | INF | 0.900 | 1.5168 | 64.2 |
| 14 | INF | 0.125 | | |

TABLE 2

| | |
|---|---|
| Focal length | 13.907 (mm) |
| F number | 1.6 |
| Half image viewing angle | 24.5 (°) |
| Image height | 5.15 (mm) |
| Lens total length | 29 (mm) |
| BR (in air) | 3.46 (mm) |

TABLE 3

| Surface NO. | k | A4 | A6 | A8 | A10 |
|---|---|---|---|---|---|
| 3 | 5.4812E−02 | −1.6668E−04 | −1.9908E−07 | 3.6623E−10 | −1.6798E−10 |
| 4 | 2.2742E−02 | −4.0836E−05 | 9.9684E−07 | −1.4404E−08 | 4.9794E−11 |
| 6 | 9.9150E−02 | −1.7275E−04 | −3.2840E−06 | 4.6997E−08 | −1.6680E−09 |
| 11 | −1.2403E−01 | −6.6771E−04 | 3.5283E−05 | −1.5917E−07 | −1.8826E−08 |
| 12 | −1.0280E−04 | −1.8953E−03 | 3.3473E−05 | −4.9793E−07 | −1.6434E−09 |

TABLE 4

| Third lens | 57 (1e−7/K) |
|---|---|
| Fourth lens | 61 (1e−7/K) |

Example 2

(1) Configuration of an Imaging Lens

Figure 3:
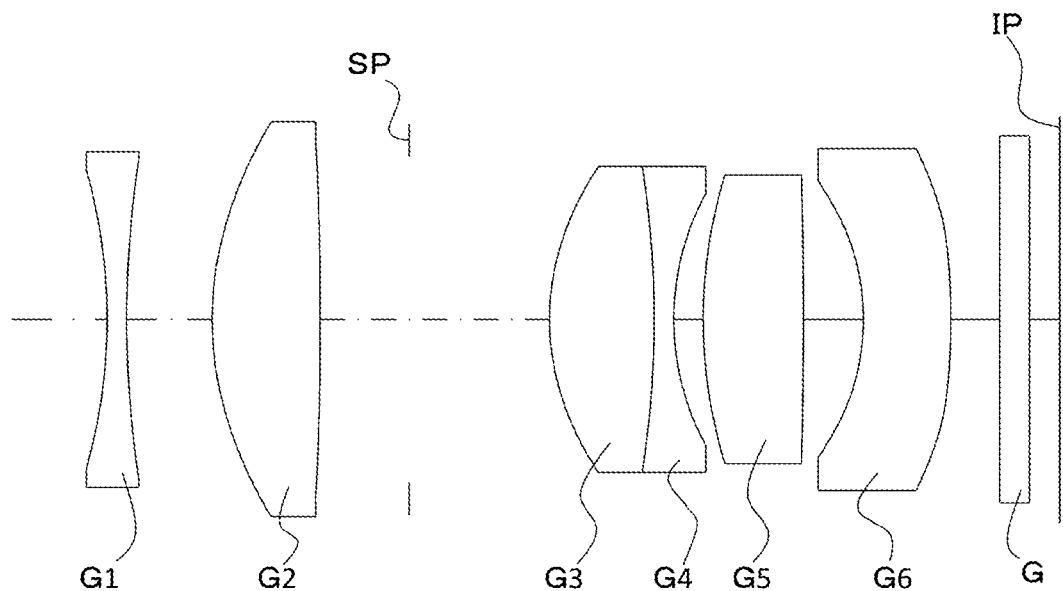
FIG. 3 is a sectional view showing a lens configuration example of an imaging lens of an example 2 according to the present invention.

FIG. 3 is a lens sectional view showing the configuration of an imaging lens of an example 2 according to the present invention. The imaging lens is configured from, in order from the object side, the biconcave-shaped first lens G1 having negative refractive power, the biconvex-shaped second lens G2 having positive refractive power, a cemented lens formed by cementing the third lens G3 having positive refractive power and the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n−1-th lens in the present invention, the fourth lens G4 is the n−2-th lens in the present invention, and the third lens G3 is the n−3-th lens in the present invention. As shown in Table 5 below, both the surfaces of the second lens G2, the object side surface of the third lens G3 (the n−3-th lens), and both the surfaces of the sixth lens G6 (the n-th lens) are respectively aspherical surfaces.

(2) Numerical Value Examples

Figure 4:
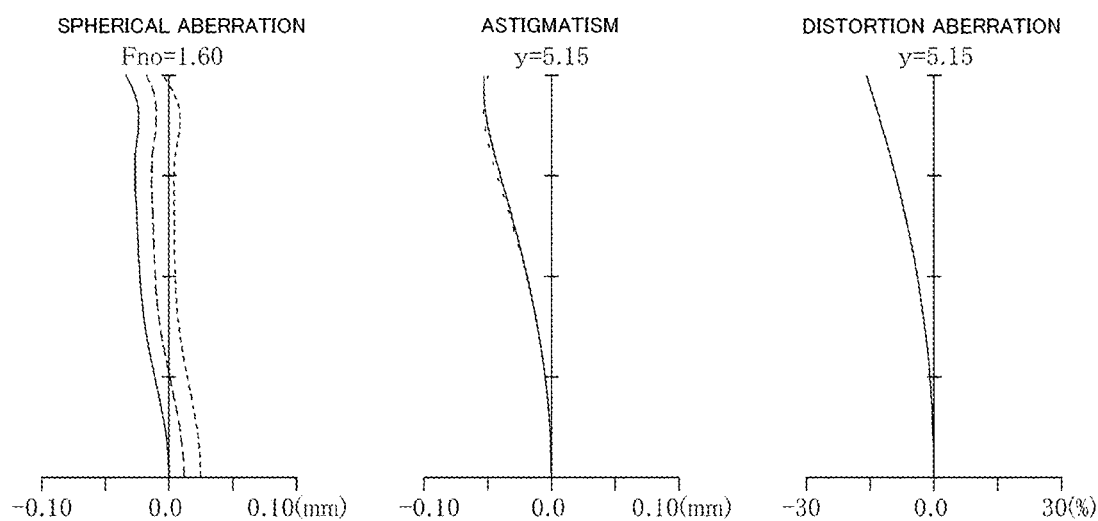
FIG. 4 is a spherical aberration diagram, an astigmatism diagram, and a distortion aberration diagram during infinity focus of the imaging lens of the example 2.

Numerical value examples applied with specific numerical values of the imaging lens adopted in the example 2 are explained. Lens data of the imaging lens, various data of the imaging lens, aspherical surface data, and average coefficients of linear expansion (unit: $1 \times 10^{-7}$/K) at −30° to 70° C. of glass materials forming the n−3-th lens and the n−2-th lens are respectively shown in Tables 5 to 8. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 5 can be referred to. In FIG. 4, a longitudinal aberration diagram during infinity focus of the imaging lens is shown. As shown in FIG. 4, the imaging lens has a large negative distortion aberration.

TABLE 5

| Surface NO. | r | d | nd | vd |
|---|---|---|---|---|
| 1 | −16.380 | 0.600 | 1.5688 | 56.04 |
| 2 | 32.200 | 2.597 | | |
| 3※ | 9.771 | 3.290 | 1.5920 | 67.02 |
| 4※ | −152.783 | 2.712 | | |
| 5 (Stop) | INF | 4.270 | | |
| 6※ | 7.466 | 3.180 | 1.7725 | 49.5 |
| 7 | −30.000 | 0.600 | 1.7521 | 25.05 |
| 8 | 7.930 | 0.897 | | |
| 9 | 14.730 | 3.050 | 1.8348 | 42.72 |
| 10 | −170.540 | 1.820 | | |
| 11※ | −7.400 | 2.660 | 1.5920 | 67.02 |
| 12※ | −32.593 | 1.500 | | |
| 13 | INF | 0.900 | 1.5168 | 64.2 |
| 14 | INF | 0.923 | | |

TABLE 6

| Focal length | 13.908 (mm) |
|---|---|
| F number | 1.6 |
| Half image viewing angle | 23.79 (°) |
| Image height | 5.15 (mm) |
| Lens total length | 29 (mm) |
| BF (in air) | 3.02 (mm) |

TABLE 7

| Surface NO. | k | A4 | A6 | A8 | A10 |
|---|---|---|---|---|---|
| 3 | 3.2929E−02 | −1.6927E−04 | −3.3152E−07 | −2.7054E−08 | 5.9807E−10 |
| 4 | −1.5322E−02 | −7.9222E−05 | 3.5286E−07 | 1.3335E−08 | 1.4942E−10 |
| 6 | 3.7593E−01 | −2.7826E−04 | −9.0186E−06 | 2.5416E−07 | −9.5350E−09 |
| 11 | 1.4815E−01 | −7.0597E−04 | 1.7428E−05 | 6.8858E−07 | −1.8604E−09 |
| 12 | −1.7385E−02 | −1.5440E−03 | 2.2798E−05 | −1.7298E−08 | 3.1512E−09 |

TABLE 8

| Average coefficient of linear expansion | |
|---|---|
| Third lens | 57 (1e−7/K) |
| Fourth lens | 61 (1e−7/K) |

Example 3

(1) Configuration of an Imaging Lens

Figure 5:
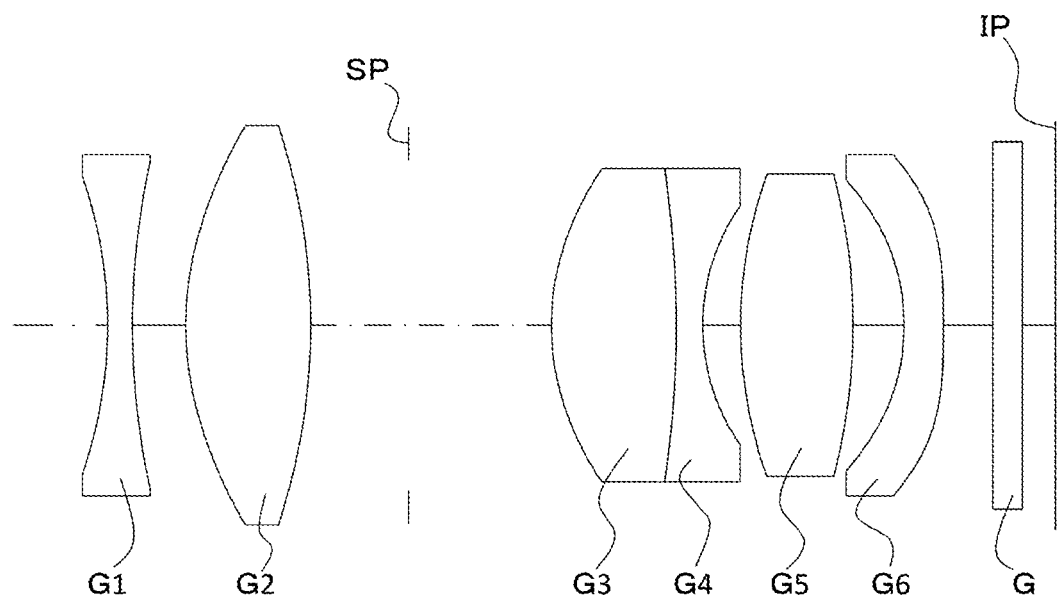
FIG. 5 is a sectional view showing a lens configuration example of an imaging lens of an example 3 according to the present invention.

FIG. 5 is a lens sectional view showing the configuration of an imaging lens of an example 3 according to the present invention. The imaging lens is configured from, in order from the object side, the biconcave-shaped first lens G1 having negative refractive power, the biconvex-shaped second lens G2 having positive refractive power, a cemented lens formed by cementing the third lens G3 having positive refractive power and the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n−1-th lens in the present invention, the fourth lens G4 is the n−2-th lens in the present invention, and the third lens G3 is the n−3-th lens in the present invention. As shown in Table 9 below, both the surfaces of the second lens G2, the object side surface of the third lens G3 (the n−3-th lens), and both the surfaces of the sixth lens G6 (the n-th lens) are respectively aspherical surfaces.

(2) Numerical Value Examples

Figure 6:
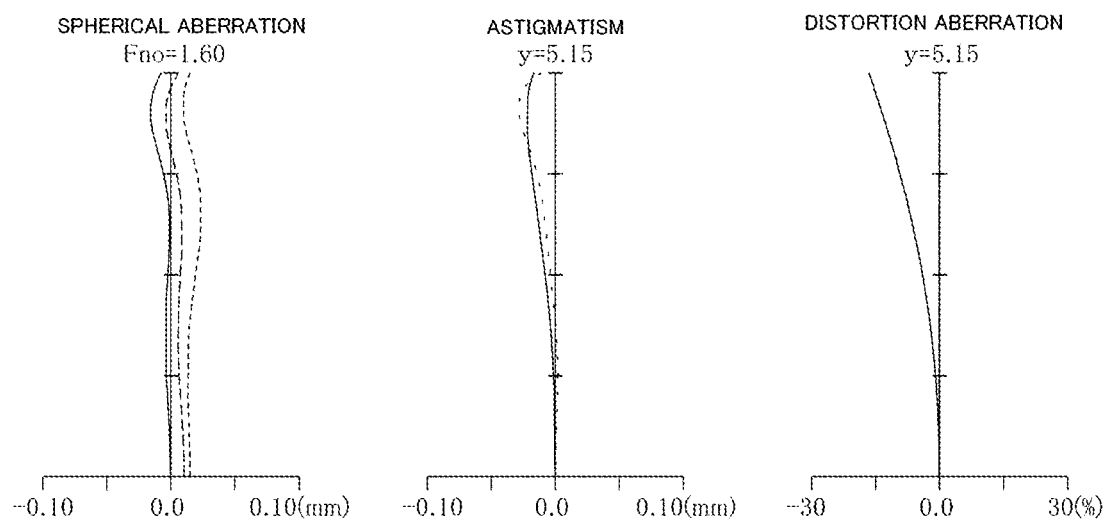
FIG. 6 is a spherical aberration diagram, an astigmatism diagram, and a distortion aberration diagram during infinity focus of the imaging lens of the example 3.

Numerical value examples applied with specific numerical values of the imaging lens adopted in the example 3 are explained. Lens data of the imaging lens, various data of the imaging lens, aspherical surface data, and average coefficients of linear expansion (unit: $1 \times 10^{-7}$/K) at $-30°$ to $70°$ C. of glass materials forming the n−3-th lens and the n−2-th lens are respectively shown in Tables 9 to 12. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 9 can be referred to. In FIG. 6, a longitudinal aberration diagram during infinity focus of the imaging lens is shown. As shown in FIG. 6, the imaging lens has a large negative distortion aberration.

TABLE 9

| Surface NO. | r | d | nd | vd |
|---|---|---|---|---|
| 1 | −13.526 | 0.756 | 1.5688 | 56.04 |
| 2 | 23.032 | 1.622 | | |
| 3※ | 9.491 | 3.800 | 1.4971 | 81.56 |
| 4※ | −19.744 | 2.987 | | |
| 5 (Stop) | INF | 4.342 | | |
| 6※ | 7.551 | 3.799 | 1.8513 | 40.1 |
| 7 | −32.194 | 0.807 | 1.7521 | 25.05 |
| 8 | 6.262 | 1.157 | | |
| 9 | 13.472 | 3.422 | 1.4971 | 81.56 |
| 10 | −17.848 | 1.548 | | |
| 11※ | −6.917 | 1.200 | 1.4971 | 81.56 |
| 12※ | −49.802 | 1.500 | | |
| 13 | INF | 0.900 | 1.5168 | 64.2 |
| 14 | INF | 1.006 | | |

TABLE 10

| Focal length | 13.91 (mm) |
|---|---|
| F number | 1.6 |

TABLE 10-continued

| Half image viewing angle | 23.93 (°) |
|---|---|
| Image height | 5.15 (mm) |
| Lens total length | 28.85 (mm) |
| BF (in air) | 3.1 (mm) |

TABLE 11

| Surface NO. | k | A4 | A6 | A8 | A10 |
|---|---|---|---|---|---|
| 3 | 1.8306E−01 | −2.8588E−04 | 2.8471E−07 | −5.1302E−08 | 7.3500E−10 |
| 4 | 1.6840E−02 | −9.1081E−05 | 2.7234E−06 | −6.6396E−08 | 1.2396E−09 |
| 6 | 1.2291E−01 | −2.2230E−04 | −3.6730E−06 | 4.1133E−08 | −2.6726E−09 |
| 11 | 1.3951E−01 | −1.5672E−03 | 1.1404E−04 | −5.3081E−06 | 1.3477E−07 |
| 12 | −2.5331E−02 | −3.0891E−03 | 9.9588E−05 | −3.4793E−06 | 6.0280E−08 |

TABLE 12

| Third lens | 60 (1e−7/K) |
|---|---|
| Fourth lens | 61 (1e−7/K) |

Example 4

(1) Configuration of an Imaging Lens

Figure 7:
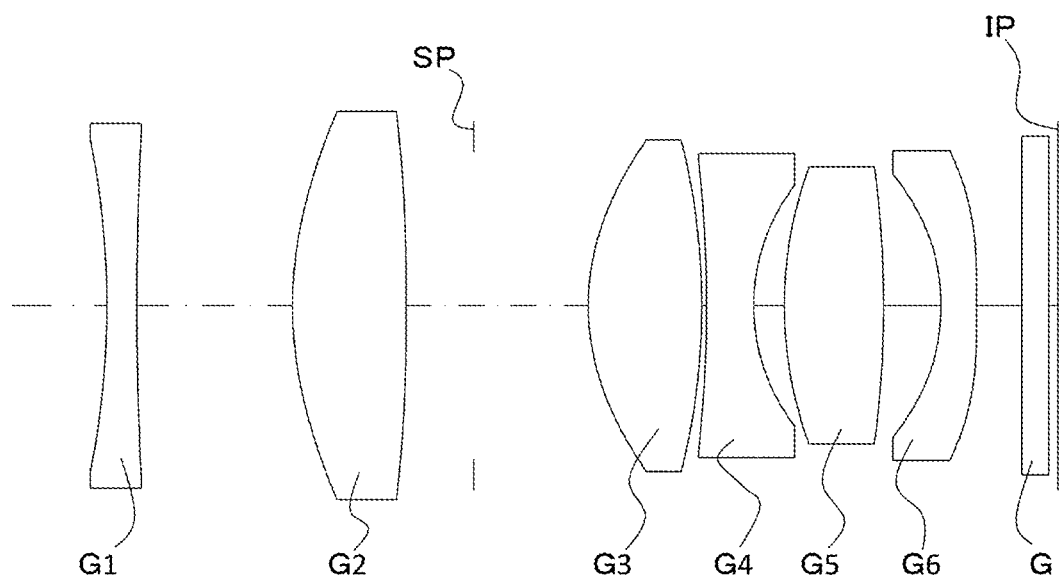
FIG. 7 is a sectional view showing a lens configuration example of an imaging lens of an example 4 according to the present invention.

FIG. 7 is a lens sectional view showing the configuration of an imaging lens of an example 4 according to the present invention. The imaging lens is configured from, in order from the object side, the biconcave-shaped first lens G1 having negative refractive power, the biconvex-shaped second lens G2 having positive refractive power, the third lens G3 having positive refractive power, the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n−1-th lens in the present invention, the fourth lens G4 is the n−2-th lens in the present invention, and the third lens G3 is the n−3-th lens in the present invention. Note that, in the imaging lens of the example 4, the n−3-th lens and the n−2-th lens are not cemented. As shown in Table 13 below, both the surfaces of the second lens G2, the object side surface of the third lens G3 (the n−3-th lens), and both the surfaces of the sixth lens G6 (the n-th lens) are respectively aspherical surfaces.

(2) Numerical Value Examples

Figure 8:
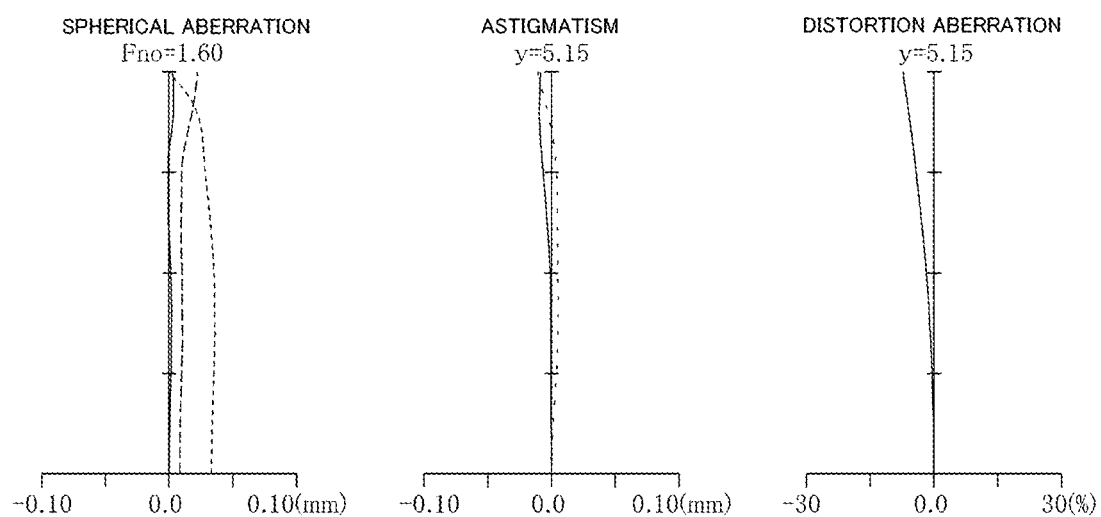
FIG. 8 is a spherical aberration diagram, an astigmatism diagram, and a distortion aberration diagram during infinity focus of the imaging lens of the example 4.

Numerical value examples applied with specific numerical values of the imaging lens adopted in the example 4 are explained. Lens data of the imaging lens, various data of the imaging lens, aspherical surface data, and average coefficients of linear expansion (unit: $1 \times 10^{-7}$/K) at $-30°$ to $70°$ C. of glass materials forming the n−3-th lens and the n−2-th lens are respectively shown in Tables 13 to 16. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 13 can be referred to. In FIG. 8, a longitudinal aberration diagram during infinity focus of the imaging lens is shown. As shown in FIG. 8, the imaging lens has a large negative distortion aberration.

TABLE 13

| Surface NO. | r | d | nd | vd |
|---|---|---|---|---|
| 1 | −27.539 | 1.000 | 1.8348 | 42.72 |
| 2 | 114.795 | 5.204 | | |
| 3※ | 12.795 | 3.800 | 1.5920 | 67.02 |
| 4※ | −110.755 | 2.257 | | |
| 5 (Stop) | INF | 3.828 | | |
| 6※ | 7.767 | 3.800 | 1.6935 | 53.2 |
| 7 | −22.244 | 0.150 | | |
| 8 | −45.255 | 1.582 | 1.7408 | 27.76 |
| 9 | 6.502 | 1.022 | | |
| 10 | 13.217 | 3.319 | 1.5935 | 67 |
| 11 | −34.282 | 1.916 | | |
| 12※ | −7.496 | 1.200 | 1.5831 | 59.46 |
| 13※ | −99.888 | 1.500 | | |
| 14 | INF | 0.900 | 1.5168 | 64.2 |
| 15 | INF | 0.300 | | |

TABLE 14

| | |
|---|---|
| Focal length | 13.905 (mm) |
| F number | 1.6 |
| Half image viewing angle | 21.77 (°) |
| Image height | 5.15 (mm) |
| Lens total length | 31.78 (mm) |
| BF (in air) | 2.395 (mm) |

TABLE 15

| Surface NO. | k | A4 | A6 | A8 | A10 |
|---|---|---|---|---|---|
| 3 | −5.3703E−02 | −1.3544E−04 | 3.5887E−08 | −2.0573E−08 | 4.2424E−10 |
| 4 | 2.6535E−04 | −1.4428E−04 | 1.6152E−06 | −2.0561E−08 | 4.7033E−10 |
| 6 | −5.7463E−02 | −2.4313E−04 | −1.8935E−06 | −1.7245E−08 | −9.0102E−10 |
| 12 | 3.9939E−01 | −1.6781E−03 | 1.1222E−04 | −3.2385E−06 | 5.6553E−08 |
| 13 | 3.2431E−04 | −2.3763E−03 | 8.8854E−05 | −2.1808E−06 | 2.4003E−08 |

TABLE 16

| | |
|---|---|
| Third lens | 65 (1e-7/K) |
| Fourth lens | 91 (1e-7/K) |

Example 5

(1) Configuration of an Imaging Lens

Figure 9:
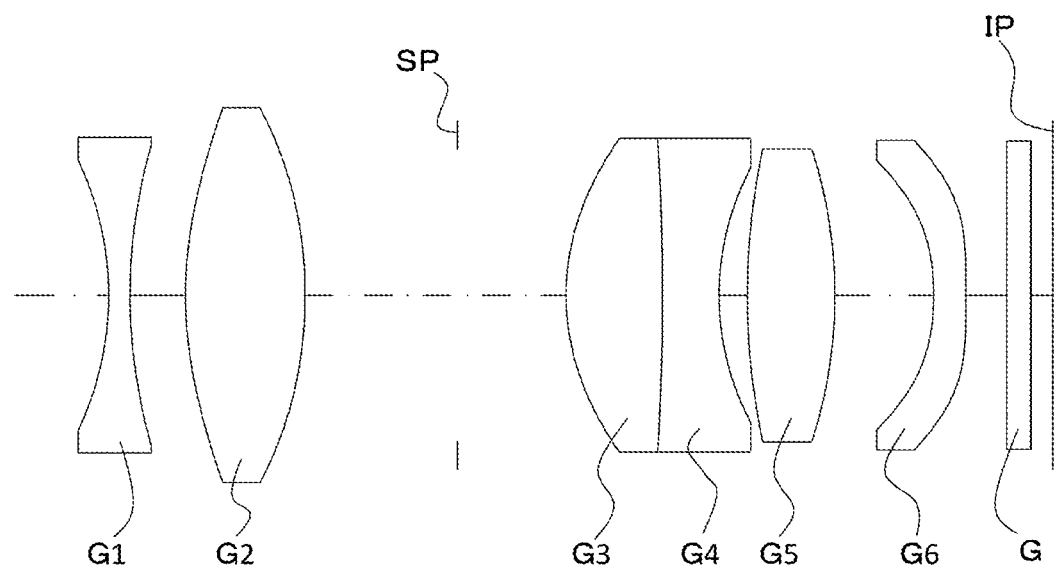
FIG. 9 is a sectional view showing a lens configuration example of an imaging lens of an example 5 according to the present invention.

FIG. 9 is a lens sectional view showing the configuration of an imaging lens of an example 5 according to the present invention. The imaging lens is configured from, in order from the object side, the biconcave-shaped first lens G1 having negative refractive power, the biconvex-shaped second lens G2 having positive refractive power, a cemented lens formed by cementing the third lens G3 having positive refractive power and the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n−1-th lens in the present invention, the fourth lens G4 is the n−2-th lens in the present invention, and the third lens G3 is the n−3-th lens in the present invention. As shown in Table 17 below, both the surfaces of the second lens G2, the object side surface of the third lens G3 (the n−3-th lens), and both the surfaces of the sixth lens G6 (the n-th lens) are respectively aspherical surfaces.

(2) Numerical Value Examples

Figure 10:
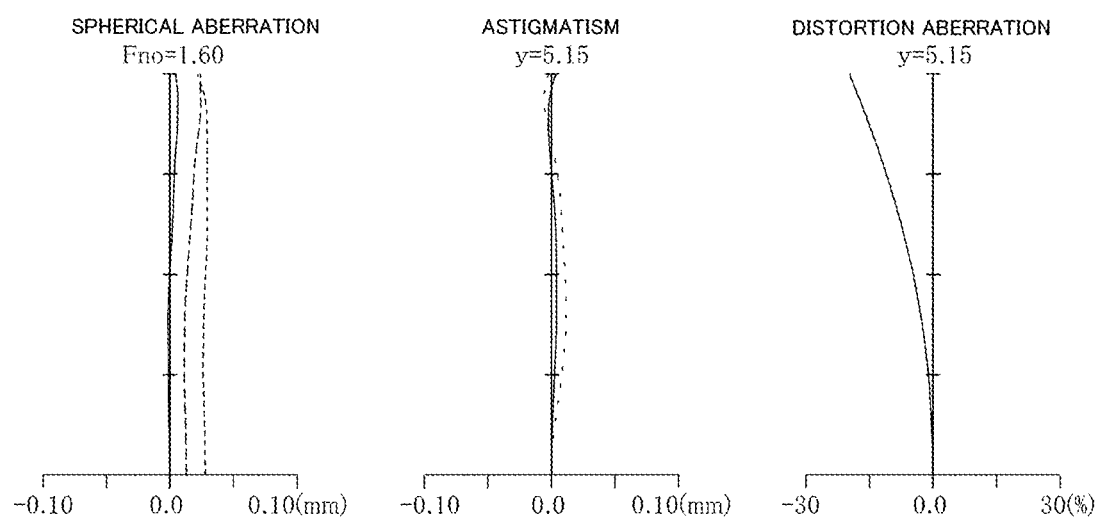
FIG. 10 is a spherical aberration diagram, an astigmatism diagram, and a distortion aberration diagram during infinity focus of the imaging lens of the example 5.

Numerical value examples applied with specific numerical values of the imaging lens adopted in the example 5 are explained. Lens data of the imaging lens, various data of the imaging lens, aspherical surface data, and average coefficients of linear expansion (unit: $1×10^{−7}$/K) at −30° to 70° C. of glass materials forming the n−3-th lens and the n−2-th lens are respectively shown in Tables 17 to 20. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 17 can be referred to. In FIG. 10, a longitudinal aberration diagram during infinity focus of the imaging lens is shown. As shown in FIG. 10, the imaging lens has a large negative distortion aberration.

TABLE 17

| Surface NO. | r | d | nd | vd |
|---|---|---|---|---|
| 1 | −11.517 | 0.800 | 1.5688 | 56.04 |
| 2 | 19.834 | 2.055 | | |

TABLE 17-continued

| Surface NO. | r | d | nd | vd |
|---|---|---|---|---|
| 3※ | 14.866 | 4.430 | 1.5920 | 67.02 |
| 4※ | −16.393 | 5.641 | | |
| 5 (Stop) | INF | 4.039 | | |
| 6※ | 8.668 | 3.572 | 1.7290 | 54.04 |
| 7 | −96.353 | 2.103 | 1.7521 | 25.05 |
| 8 | 9.970 | 1.047 | | |
| 9 | 25.851 | 3.248 | 1.5935 | 67 |
| 10 | −17.262 | 3.666 | | |
| 11※ | −8.998 | 1.200 | 1.5831 | 59.46 |
| 12※ | −119.216 | 1.500 | | |
| 13 | INF | 0.900 | 1.5168 | 64.2 |
| 14 | INF | 0.805 | | |

TABLE 18

| | |
|---|---|
| Focal length | 13.908 (mm) |
| F number | 1.6 |
| Half image viewing angle | 24.77 (°) |
| Image height | 5.15 (mm) |
| Lens total length | 35 (mm) |
| BF(in air) | 2.9 (mm) |

TABLE 19

| Surface NO. | k | A4 | A6 | A8 | A10 |
|---|---|---|---|---|---|
| 3 | −1.2572E−01 | −1.5056E−04 | 1.7415E−07 | 2.1636E−09 | 2.6125E−11 |
| 4 | −1.9852E−01 | −1.0006E−04 | 6.1315E−07 | −3.0889E−09 | 4.8622E−11 |
| 6 | 2.7666E−01 | −2.0365E−04 | −2.1727E−06 | 1.3591E−08 | −1.1014E−09 |
| 11 | 3.5047E−01 | −2.2029E−03 | 1.0371E−04 | −3.9091E−06 | 7.0444E−08 |
| 12 | 2.1872E−04 | −3.3201E−03 | 9.4030E−05 | −2.3918E−06 | 3.2402E−08 |

TABLE 20

| Third lens | 61 (1e−7/K) |
|---|---|
| Fourth lens | 61 (1e−7/K) |

Example 6

(1) Configuration of an Imaging Lens

Figure 11:
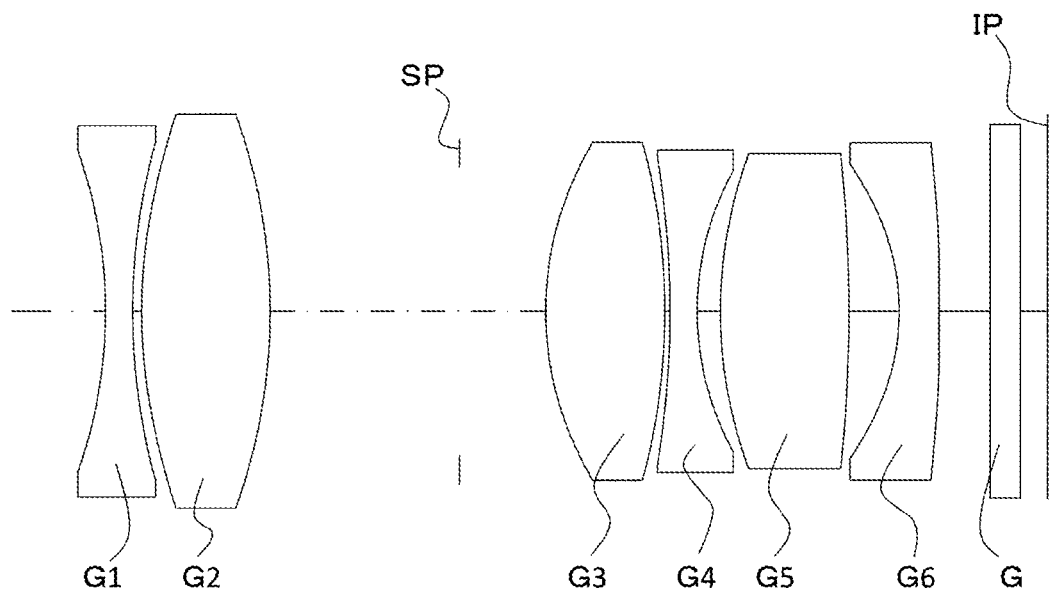
FIG. 11 is a sectional view showing a lens configuration example of an imaging lens of an example 6 according to the present invention.

FIG. 11 is a lens sectional view showing the configuration of an imaging lens of an example 6 according to the present invention. The imaging lens is configured from, in order from the object side, the biconcave-shaped first lens G1 having negative refractive power, the biconvex-shaped second lens G2 having positive refractive power, a cemented lens formed by cementing the third lens G3 having positive refractive power and the fourth lens G4 having negative refractive power, the biconvex-shaped fifth lens G5 having positive refractive power, and the sixth lens G6 having negative refractive power and a meniscus shape which has a convex surface to an image side. The aperture stop SP is arranged between the second lens G2 and the third lens G3. The imaging lens is a fixed focus lens, the focal length of which is fixed. In the imaging lens, the sixth lens G6 is the n-th lens in the present invention, the fifth lens G5 is the n−1-th lens in the present invention, the fourth lens G4 is the n−2-th lens in the present invention, and the third lens G3 is the n−3-th lens in the present invention. Note that, in the imaging lens of the example 6, the n−3-th lens and the n−2-th lens are not cemented. As shown in Table 21 below, both the surfaces of the second lens G2, both the surfaces of the third lens G3 (the n−3-th lens), and both the surfaces of the sixth lens G6 (the n-th lens) are respectively aspherical surfaces.

(2) Numerical Value Examples

Figure 12:
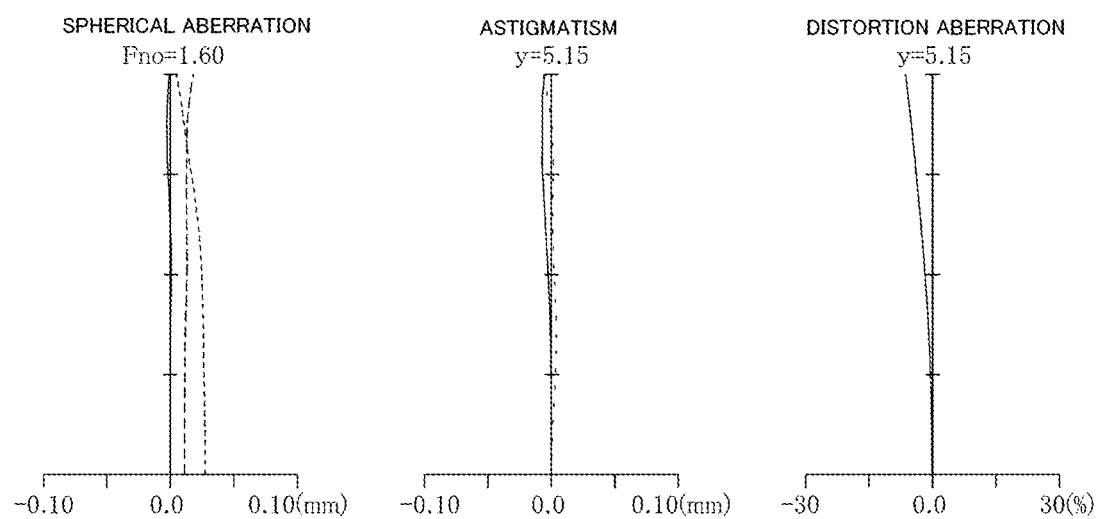
FIG. 12 is a spherical aberration diagram, an astigmatism diagram, and a distortion aberration diagram during infinity focus of the imaging lens of the example 6.

Numerical value examples applied with specific numerical values of the imaging lens adopted in the example 6 are explained. Lens data of the imaging lens, various data of the imaging lens, aspherical surface data, and average coefficients of linear expansion (unit: $1\times10^{-7}$/K) at −30° to 70° C. of glass materials forming the n−3-th lens and the n−2-th lens are respectively shown in Tables 21 to 24. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 21 can be referred to. In FIG. 12, a longitudinal aberration diagram during infinity focus of the imaging lens is shown. As shown in FIG. 12, the imaging lens has a large negative distortion aberration.

TABLE 21

| Surface NO. | r | d | nd | v d |
|---|---|---|---|---|
| 1 | −14.001 | 0.800 | 1.6727 | 32.17 |
| 2 | 18.462 | 0.266 | | |
| 3※ | 14.897 | 3.800 | 1.8513 | 40.1 |
| 4※ | −17.053 | 5.596 | | |
| 5 (Stop) | INF | 2.547 | | |
| 6※ | 9.337 | 3.524 | 1.6935 | 53.2 |
| 7※ | −19.046 | 0.150 | | |
| 8 | −27.719 | 0.804 | 1.7521 | 25.05 |
| 9 | 8.514 | 0.686 | | |
| 10 | 13.151 | 3.800 | 1.8810 | 40.14 |
| 11 | −43.437 | 1.480 | | |
| 12※ | −7.197 | 1.190 | 1.5831 | 59.46 |
| 13※ | −500.000 | 1.500 | | |
| 14 | INF | 0.900 | 1.5168 | 64.2 |
| 15 | INF | 0.799 | | |

TABLE 22

| Focal length | 13.91 (mm) |
|---|---|
| F number | 1.6 |
| Half image viewing angle | 21.57 (°) |
| Image height | 5.15 (mm) |
| Lens total length | 27.85 (mm) |
| BF(in air) | 2.897 (mm) |

TABLE 23

| Surface NO. | k | A4 | A6 | A8 | A10 |
|---|---|---|---|---|---|
| 3 | 1.6471E−01 | −1.4425E−04 | 2.9986E−07 | −2.6470E−08 | 6.0155E−10 |
| 4 | −3.4489E−01 | −1.3532E−05 | −5.1946E−08 | −1.2124E−08 | 3.2213E−10 |
| 6 | 2.5482E−01 | −6.2917E−05 | −2.6858E−06 | 1.5960E−07 | −5.6309E−09 |
| 7 | 0.0000E+00 | −2.5789E−05 | 1.2620E−06 | 9.5209E−08 | −5.5006E−09 |
| 12 | 2.5865E−01 | −1.0513E−03 | 1.1652E−04 | −3.8725E−06 | 5.0778E−08 |
| 13 | 1.8463E−06 | −1.5222E−03 | 9.8945E−05 | −2.9542E−06 | 3.4750E−08 |

TABLE 24

| Third lens | 61 (1e−7/K) |
|---|---|
| Fourth lens | 61 (1e−7/K) |

Example 7

(1) Configuration of an Imaging Lens

Figure 13:
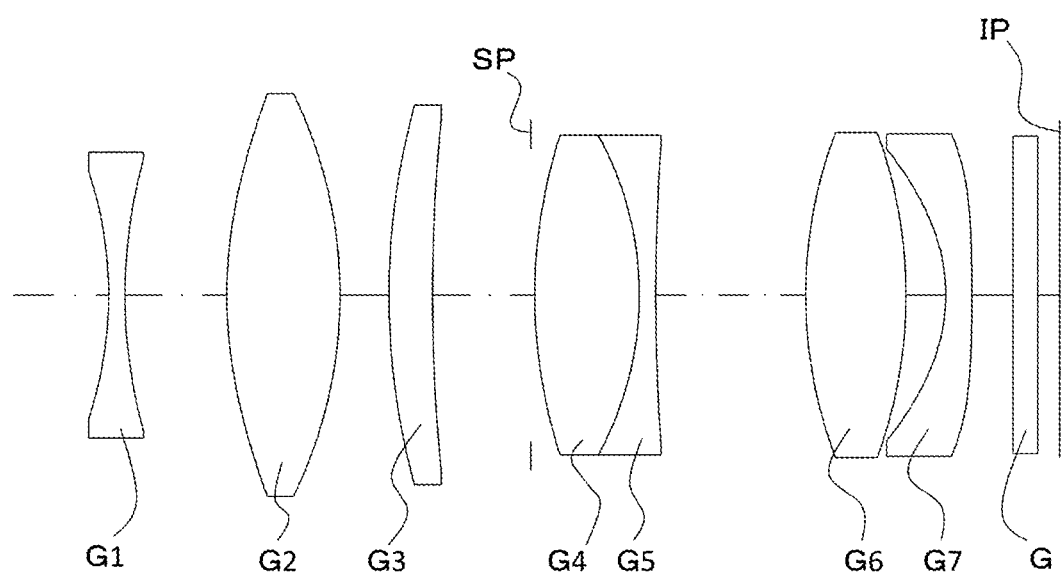
FIG. 13 is a sectional view showing a lens configuration example of an imaging lens of an example 7 according to the present invention.

FIG. 13 is a lens sectional view showing the configuration of an imaging lens of an example 7 according to the present invention. The imaging lens is configured from, in order from the object side, the biconcave-shaped first lens G1 having negative refractive power, the biconvex-shaped second lens G2 having positive refractive power, the third lens G3 having positive refractive power, a cemented lens formed by cementing the fourth lens G4 having positive refractive power and the fifth lens G5 having negative refractive power, the biconvex-shaped sixth lens G6 having positive refractive power, and the seventh lens G7 having negative refractive power and a meniscus shape which has a convex surface to an image side. The aperture stop SP is arranged between the third lens G3 and the fourth lens G4. The imaging lens is a fixed focus lens, the focal length of which is fixed. In the imaging lens, the seventh lens G7 is the n-th lens in the present invention, the sixth lens G6 is the n−1-th lens in the present invention, the fifth lens G5 is the n−2-th lens in the present invention, and the fourth lens G4 is the n−3-th lens in the present invention. As shown in Table 25 below, both the surfaces of the second lens G2 and both the surfaces of the seventh lens G7 (the n-th lens) are respectively aspherical surfaces. The imaging lens of the example 7 includes the third lens G3 having the positive refractive power between the second lens G2 and the fourth lens G4, which is the n−3-th lens. Therefore, the positive refractive power distributed to the n−3-th lens of the example 1 to the example 6 can be distributed to the third lens G3 and the fourth lens G4, which is the n−3-th lens, in the imaging lens of the example 7. Therefore, by adjusting surface shapes of the third lens G3 and the fourth lens G4, it is possible to satisfactorily perform correction of a spherical aberration even if an aspherical surface is not provided on the n−3-th lens.

(2) Numerical Value Examples

Figure 14:
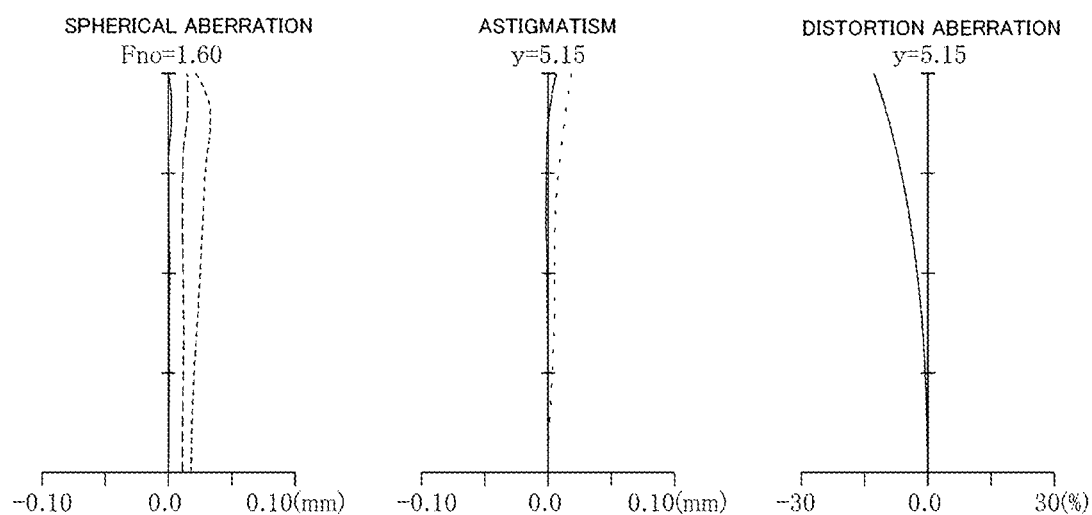
FIG. 14 is a spherical aberration diagram, an astigmatism diagram, and a distortion aberration diagram during infinity focus of the imaging lens of the example 7.

Numerical value examples applied with specific numerical values of the imaging lens adopted in the example 7 are explained. Lens data of the imaging lens, various data of the imaging lens, aspherical surface data, and average coefficients of linear expansion (unit: $1 \times 10^{-7}/K$) at −30° to 70° C. of glass materials forming the n−3-th lens and the n−2-th lens are respectively shown in Tables 25 to 28. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 25 can be referred to. In FIG. 14, a longitudinal aberration diagram during infinity focus of the imaging lens is shown. As shown in FIG. 14, the imaging lens has a large negative distortion aberration.

TABLE 25

| Surface NO. | r | d | nd | νd |
|---|---|---|---|---|
| 1 | 14.088 | 0.600 | 1.6477 | 33.84 |
| 2 | 18.349 | 3.709 | | |
| 3※ | 16.343 | 4.121 | 1.5920 | 67.02 |
| 4※ | −16.366 | 1.780 | | |
| 5 | 25.770 | 1.590 | 1.9229 | 20.88 |
| 6 | 66.252 | 3.577 | | |
| 7 (Stop) | INF | 0.150 | | |
| 8 | 18.751 | 3.800 | 1.5935 | 67 |
| 9 | −11.900 | 0.600 | 1.7521 | 25.05 |
| 10 | 76.484 | 5.457 | | |
| 11 | 16.383 | 3.656 | 1.5935 | 67 |
| 12 | −16.971 | 1.447 | | |
| 13※ | −6.606 | 0.946 | 1.6889 | 31.16 |
| 14※ | −194.894 | 1.500 | | |
| 15 | INF | 0.900 | 1.5168 | 64.2 |
| 16 | INF | 0.800 | | |

TABLE 26

| | |
|---|---|
| Focal length | 13.908 (mm) |
| F number | 1.6 |
| Half image viewing angle | 23 (°) |
| Image height | 5.15 (mm) |
| Lens total length | 34.64 (mm) |
| BF(in air) | 2.898 (mm) |

TABLE 27

| Surface NO. | k | A4 | A6 | A8 | A10 |
|---|---|---|---|---|---|
| 3 | 1.7160E−01 | −8.9279E−05 | −8.5220E−08 | 5.9892E−10 | 1.4169E−11 |
| 4 | −6.5424E−01 | −1.3806E−05 | −1.4564E−07 | 6.1160E−10 | 1.7873E−11 |
| 13 | 9.5742E−02 | −1.2600E−04 | 5.9364E−05 | −1.9040E−06 | 3.1619E−08 |
| 14 | 1.3711E−05 | −9.8856E−04 | 3.6395E−05 | −1.1717E−06 | 1.3709E−08 |

TABLE 28

| | |
|---|---|
| Third lens | 89 (1e−7/K) |
| Fourth lens | 61 (1e−7/K) |

Example 8

(1) Configuration of an Imaging Lens

Figure 15:
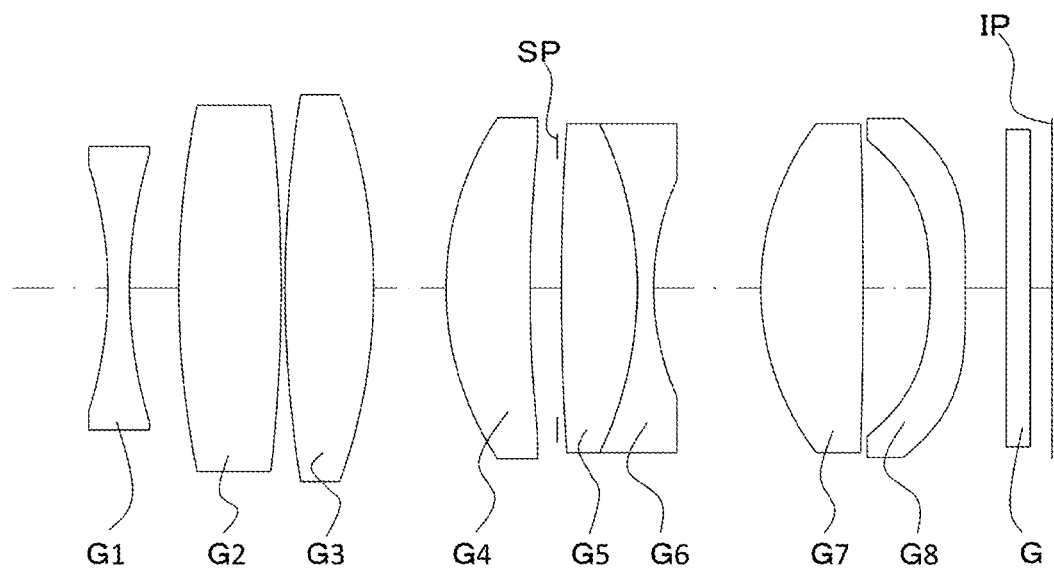
FIG. 15 is a sectional view showing a lens configuration example of an imaging lens of an example 8 according to the present invention.

FIG. 15 is a lens sectional view showing the configuration of an imaging lens of an example 8 according to the present invention. The imaging lens is configured from, in order from the object side, the biconcave-shaped first lens G1 having negative refractive power, the biconvex-shaped second lens G2 having positive refractive power, the third lens G3 having positive refractive power, the fourth lens G4 having positive refractive power, a cemented lens formed by cementing the fifth lens G5 having positive refractive power and the sixth lens G6 having negative refractive power, the biconvex-shaped seventh lens G7 having positive refractive power, and the eighth lens G8 having negative refractive power and a meniscus shape which has a convex surface to an image side. The aperture stop SP is arranged between the fourth lens G4 and the fifth lens G5. The imaging lens is a fixed focus lens, the focal length of which is fixed. In the imaging lens, the eighth lens G8 is the n-th lens in the present invention, the seventh lens G7 is the n−1-th lens in the present invention, the sixth lens G6 is the n−2-th lens in the present invention, and the fifth lens G5 is the n−3-th lens in the present invention. As shown in Table 29 below, both the surfaces of the eighth lens G8 (the n-th lens) are respectively aspherical surfaces. The imaging lens of the example 8 includes the third lens G3 having the positive refractive power and the fourth lens G4 having the positive refractive power between the second lens G2 and the fifth lens G5, which is the n−3-th lens. Therefore, the positive refractive power distributed to the second lens G2 of the example 1 to the example 6 can be distributed to the second lens G2 and the third lens G3 in the imaging lens of the example 8. The positive refractive power distributed to the n−3-th lens of the example 1 to the example 6 can be distributed to the fourth lens G4 and the fifth lens G5, which is the n−3-th lens, in the imaging lens of the example 8. Therefore, by adjusting surface shapes of the second lens G2 to the fifth lens G5, it is possible to satisfactorily perform correction of a spherical aberration even if an aspherical surface is not provided on the second lens G2 and the n−3-th lens. A value of a composite focal length of the fifth lens G5, which is the n−3-th lens, and the fourth lens G4, which is the n−2-th lens, is negative.

(2) Numerical Value Examples

Figure 16:
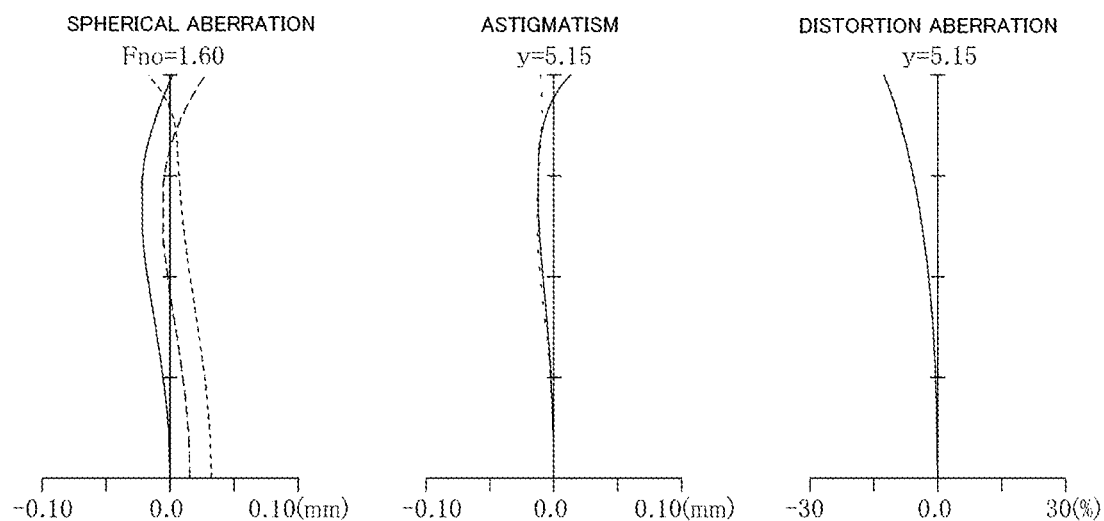
FIG. 16 is a spherical aberration diagram, an astigmatism diagram, and a distortion aberration diagram during infinity focus of the imaging lens of the example 8.

Numerical value examples applied with specific numerical values of the imaging lens adopted in the example 8 are explained. Lens data of the imaging lens, various data of the imaging lens, aspherical surface data, and average coefficients of linear expansion (unit: $1\times10^{-7}$/K) at −30° to 70° C. of glass materials forming the n−3-th lens and the n−2-th lens are respectively shown in Tables 29 to 32. The numerical values of the conditional expression (1), the conditional expression (2), and the conditional expressions (4) to (10) of the imaging lens are shown in Table 33. Note that, as the numerical value of the conditional expression (3), a field of "r" of the lens data shown in Table 29 can be referred to. In FIG. 16, a longitudinal aberration diagram during infinity focus of the imaging lens is shown. As shown in FIG. 16, the imaging lens has a large negative distortion aberration.

TABLE 29

| Surface NO. | r | d | nd | ν d |
|---|---|---|---|---|
| 1 | −14.689 | 0.802 | 1.7552 | 27.53 |
| 2 | 16.711 | 1.825 | | |
| 3 | 33.741 | 3.800 | 1.8081 | 22.76 |
| 4 | −58.710 | 0.150 | | |
| 5 | 44.722 | 3.278 | 1.8042 | 46.5 |
| 6 | −20.759 | 2.682 | | |
| 7 | 11.262 | 3.121 | 1.7292 | 54.67 |
| 8 | 52.271 | 1.009 | | |
| 9 (Stop) | INF | 0.150 | | |
| 10 | 92.058 | 2.819 | 1.5935 | 67 |
| 11 | −13.738 | 0.600 | 1.7521 | 25.05 |
| 12 | 9.686 | 3.971 | | |
| 13 | 9.946 | 3.800 | 1.6968 | 55.46 |
| 14 | −200.098 | 2.485 | | |
| 15※ | −15.771 | 1.306 | 1.5831 | 59.46 |
| 16※ | −500.000 | 1.500 | | |
| 17 | INF | 0.900 | 1.5168 | 64.2 |
| 18 | INF | 0.806 | | |

TABLE 30

| | |
|---|---|
| Focal length | 13.904 (mm) |
| F number | 1.6 |
| Half image viewing angle | 22.98 (°) |
| Image height | 5.15 (mm) |
| Lens total length | 35 (mm) |
| BF(in air) | 2.899 (mm) |

TABLE 31

| Surface NO. | k | A4 | A6 | A8 | A10 |
|---|---|---|---|---|---|
| 15 | 6.9662E−02 | −2.1957E−03 | 3.6538E−05 | −7.4983E−07 | 8.0741E−09 |
| 16 | 2.2178E−06 | −2.2169E−03 | 3.3798E−05 | −6.2925E−07 | 5.9467E−09 |

TABLE 32

| | |
|---|---|
| Third lens | 89 (1e−7/K) |
| Fourth lens | 61 (1e−7/K) |

TABLE 33

| Conditional expression | | Example 1 | Example 2 | Example 3 | Example 4 | Example 5 | Example 6 | Example 7 | Example 8 |
|---|---|---|---|---|---|---|---|---|---|
| Conditional expression (1) | $R_{11}/f$ | −1.01 | −1.18 | −0.97 | −1.98 | −0.83 | −1.01 | −1.01 | −1.06 |
| Conditional expression (2) | w | 24.5 | 23.79 | 23.93 | 21.77 | 24.77 | 21.57 | 23 | 22.98 |
| Conditional expression (4) | $d_{1-2}/f$ | 0.15 | 0.19 | 0.12 | 0.37 | 0.15 | 0.02 | 0.27 | 0.13 |
| Conditional expression (5) | $|f_1/f|$ | 1.18 | 1.37 | 1.07 | 1.91 | 0.91 | 0.84 | 0.88 | 0.74 |
| Conditional expression (6) | $f_2/f$ | 0.96 | 1.12 | 0.97 | 1.41 | 1 | 0.71 | 1.04 | 1.94 |
| Conditional expression (7) | $|f_{(n-1)n}/f|$ | 3.23 | 5.97 | 6.15 | 19.27 | 6.64 | 2.83 | −5.1 | 1.46 |
| Conditional expression (8) | $|f_n/f|$ | 0.96 | 1.21 | 1.17 | 1 | 1.2 | 0.9 | 0.72 | 2.01 |
| Conditional expression (9) | $f_{(n-3)(n-2)}/f$ | 4.88 | 2.38 | 2.47 | 3.16 | 2.46 | 5.71 | 6.98 | −0.88 |

TABLE 33-continued

| Conditional expression | | Example 1 | Example 2 | Example 3 | Example 4 | Example 5 | Example 6 | Example 7 | Example 8 |
|---|---|---|---|---|---|---|---|---|---|
| Conditional expression (10) | $\|\alpha_{(n-3)} - \alpha_{(n-2)}\|$ | 4 | 4 | 1 | 26 | 0 | 0 | 28 | 28 |
| — | $f/(4 \times YS_1)$ | 0.8 | 0.8 | 0.8 | 0.8 | 0.8 | 0.8 | 0.8 | 0.8 |

INDUSTRIAL APPLICABILITY

According to the present invention, it is possible to provide an imaging lens having a wide image viewing angle and an imaging apparatus that can form an image of a long-distance object at high resolution while, as a whole, being configured small. Therefore, the imaging lens and the imaging apparatus are suitable for imaging apparatuses mounted on various mobile bodies (a land mobile body, an air mobile body, and a marine mobile body) and imaging apparatuses installed and fixed in various buildings and the like such as an imaging apparatus for monitoring and an image apparatus for crime prevention and, in particular, suitable for a sensing camera mounted on various mobile bodies and used to detect or recognize objects present ahead in traveling directions of or around the mobile bodies.

What is claimed is:

1. An imaging lens, comprising:
a first lens having negative refractive power;
a second lens having positive refractive power;
a third lens having positive refractive power;
a fourth lens having negative refractive power;
a fifth lens having positive refractive power; and
a sixth lens having negative refractive power;
wherein the first lens to the sixth lens are sequentially disposed in order from an object side of the imaging lens toward an image side of the imaging lens;
wherein the imaging lens has a total of six lenses;
wherein the second lens has a biconvex shape;
wherein the sixth lens has a meniscus shape having a convex surface facing the image side; and
wherein the imaging lens satisfying the following conditional expressions:

$$-0.5 > R_{11}/f > -5.0 \quad (1)$$

$$2.0 < f_{(n-3)(n-2)}/f < 10.0 \quad (9)$$

where, $R_{11}$ represents a paraxial curvature radius of an object side surface of the first lens and f represents a focal length of the imaging lens, and $f_{(n-3)(n-2)}$ represents a composite focal length of the third lens and the fourth lens.

2. The imaging lens according to claim 1, wherein the imaging lens satisfies a following conditional expression:

$$0.5 < |f1/f| < 5.0 \quad (5)$$

where, f1 represents a focal length of the first lens.

3. The imaging lens according to claim 1, wherein the imaging lens $$0.5 < f2/f < 5.0 \quad (6)$$

where, f2 represents a focal length of the second lens.

4. The imaging lens according to claim 1, wherein the second lens has at least one aspheric surface.

5. The imaging lens according to claim 1, wherein the sixth lens is a meniscus shape having at least one aspheric surface and convex surface on the image side.

6. The imaging lens according to claim 1, wherein the fifth lens has a biconvex shape.

7. The imaging lens according to claim 1, wherein the imaging lens satisfies a following conditional expression:

$$0 > |f(n-1)n/f| < 50.0 \quad (7)$$

where, f(n−1)n represents a composite focal length of the fifth lens and the sixth lens.

8. The imaging lens according to claim 1, wherein
the third lens and the fourth lens are cemented, and
the imaging lens satisfies a following conditional expression:

$$0 \leq |\alpha_{(n-3)} - \alpha_{(n-2)}| < 50 \times 10^{-7} \quad (10)$$

where, $\alpha_{(n-3)}$ represents an average coefficient of linear expansion ($1 \times 10^{-7}$/K) at −30° C. to 70° C. of a glass material forming the third lens and $\alpha_{(n-2)}$ represents an average coefficient of linear expansion ($1 \times 10^{-7}$/K) at −30° C. to 70° C. of a glass material forming the fourth lens.

9. An imaging apparatus comprising:
the imaging lens according to claim 1; and
an image sensor that receives an optical image formed by the imaging lens and converts the optical image into an electric image signal.

10. The imaging lens according to claim 1, wherein the imaging lens satisfies a following conditional expression:

$$w < 45° \quad (2)$$

where, w represents a half image viewing angle of the imaging lens.

11. An imaging apparatus comprising:
the imaging lens according to claim 10; and
an image sensor that receives an optical image formed by the imaging lens and converts the optical image into an electric image signal.

* * * * *

UNITED STATES PATENT AND TRADEMARK OFFICE
CERTIFICATE OF CORRECTION

PATENT NO. : 11,579,411 B2
APPLICATION NO. : 15/989638
DATED : February 14, 2023
INVENTOR(S) : Hiroyuki Hagiwara et al.

Page 1 of 1

It is certified that error appears in the above-identified patent and that said Letters Patent is hereby corrected as shown below:

In the Claims

Column 30, Line 10, In Claim 3, after "lens" insert -- satisfies a following conditional expression: --

Column 30, Line 23, In Claim 7, delete "0>|$f$(n–1)$n/f$|<50.0" and insert -- 0<lf(n-1)n/fl<50.0 --

Signed and Sealed this
Twenty-fifth Day of April, 2023

*Katherine Kelly Vidal*

Katherine Kelly Vidal
*Director of the United States Patent and Trademark Office*